(12) United States Patent
Bellinger

(10) Patent No.: US 7,966,115 B2
(45) Date of Patent: Jun. 21, 2011

(54) SYSTEM AND METHOD FOR CONTROLLING TRANSMISSION SHIFT POINTS BASED ON VEHICLE WEIGHT

(75) Inventor: Steven M. Bellinger, Columbus, IN (US)

(73) Assignee: Cummins Inc., Columbus, IN (US)

( * ) Notice: Subject to any disclaimer, the term of this patent is extended or adjusted under 35 U.S.C. 154(b) by 986 days.

(21) Appl. No.: 11/832,884

(22) Filed: Aug. 2, 2007

(65) Prior Publication Data
US 2009/0036267 A1     Feb. 5, 2009

(51) Int. Cl.
*G06F 7/00* (2006.01)
(52) U.S. Cl. ............. 701/55; 701/51; 701/124; 700/900
(58) Field of Classification Search .................... 701/55, 701/50, 51, 12; 477/99; 180/290
See application file for complete search history.

(56) References Cited

U.S. PATENT DOCUMENTS

| | | | |
|---|---|---|---|
| 5,305,663 A | | 4/1994 | Leonard et al. |
| 5,413,539 A | | 5/1995 | Leonard et al. |
| 5,434,780 A | * | 7/1995 | Kume et al. ............. 701/65 |
| 5,598,336 A | * | 1/1997 | Kume et al. ............. 701/51 |
| 5,655,995 A | * | 8/1997 | Kondo et al. ............ 477/155 |
| 6,269,293 B1 | | 7/2001 | Correa et al. |
| 6,411,878 B2 | * | 6/2002 | Hanawa et al. .......... 701/51 |
| 6,463,821 B1 | | 10/2002 | Reed, Jr. et al. |
| 6,567,734 B2 | | 5/2003 | Bellinger et al. |
| 6,754,603 B2 | | 6/2004 | Turbett et al. |
| 7,029,419 B2 | * | 4/2006 | Gessner .................... 477/97 |
| 7,039,519 B2 | * | 5/2006 | Ishiguro et al. .......... 701/124 |
| RE39,134 E | * | 6/2006 | Ohnishi et al. .......... 701/55 |
| RE39,684 E | * | 6/2007 | Ohnishi et al. .......... 701/55 |
| 2001/0032044 A1 | * | 10/2001 | Hanawa et al. .......... 701/51 |
| 2004/0069685 A1 | | 4/2004 | Inomata et al. |
| 2004/0178005 A1 | * | 9/2004 | Carlstrom et al. ....... 177/139 |
| 2005/0010356 A1 | * | 1/2005 | Ishiguro et al. .......... 701/124 |
| 2005/0218718 A1 | * | 10/2005 | Iwatsuki et al. ......... 303/177 |
| 2006/0155447 A1 | * | 7/2006 | Uken et al. .............. 701/50 |
| 2007/0271017 A1 | * | 11/2007 | Samie ...................... 701/55 |

FOREIGN PATENT DOCUMENTS

| | | |
|---|---|---|
| JP | 03-121354 | 5/1991 |
| JP | 04-285364 | 10/1992 |
| JP | 06-094116 | 4/1994 |

OTHER PUBLICATIONS

PCT International Search Report and Written Opinion dated Feb. 20, 2009 relating to PCT/US2008/071797 (11 pages).

* cited by examiner

*Primary Examiner* — Mark Hellner
*Assistant Examiner* — Helal A Algahaim
(74) *Attorney, Agent, or Firm* — Barnes & Thornburg LLP; J. Bruce Schelkopf

(57) ABSTRACT

A system and method of controlling shift points of a transmission coupled to an internal combustion engine by modifying at least one transmission shift point schedule may comprise determining a weight of a vehicle carrying the engine and the transmission, modifying the at least one transmission shift point schedule as a function of the weight of the vehicle, and controlling automatic shifting between two or more gear ratios of the transmission in accordance with the modified at least one transmission shift point schedule.

20 Claims, 9 Drawing Sheets

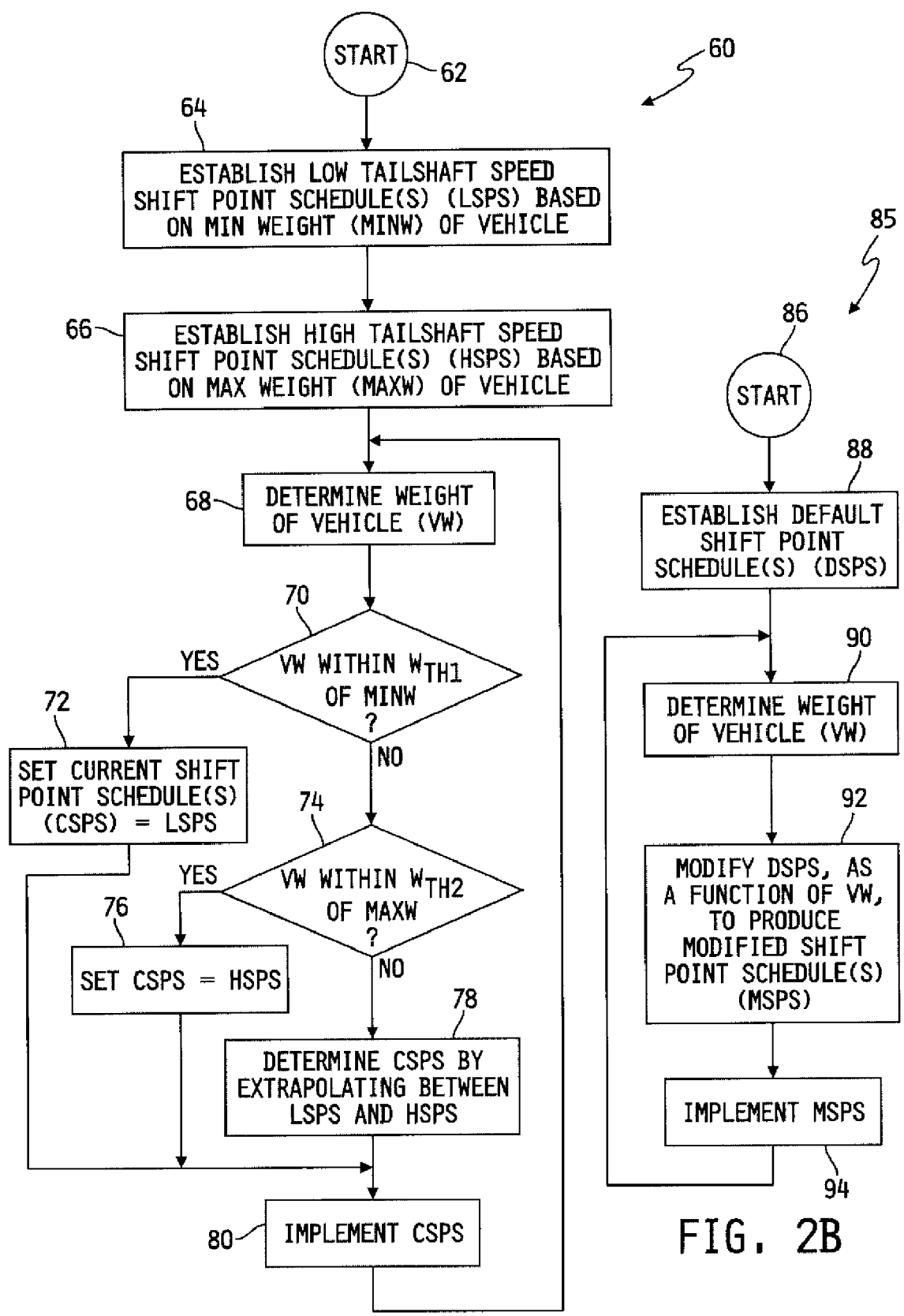

SYSTEM AND METHOD FOR CONTROLLING TRANSMISSION SHIFT POINTS BASED ON VEHICLE WEIGHT

FIELD OF THE INVENTION

The present invention relates generally to systems for controlling the automatic shifting of a motor vehicle transmission coupled to an internal combustion engine, and more specifically to such systems configured to control transmission shift points based on vehicle weight.

BACKGROUND

Conventional shift point schedules for transmission coupled to internal combustion engines are typically designed based on a target weight of the vehicle carrying the engine and transmission. In some applications, an additional set of shift point schedules may be made available for use when hauling heavy loads. It is desirable to automatically control transmission shift points as a function of current vehicle weight.

SUMMARY

The present invention may comprise one or more of the features recited in the attached claims, and/or one or more of the following features and combinations thereof. A system for controlling shift points of a transmission carried by a motor vehicle may comprise means for determining a weight of the vehicle, a memory unit having stored therein at least one transmission shift point schedule and having stored therein at least one set of instructions, and a control circuit configured to execute the at least one set of instructions to modify the at least one transmission shift point schedule as a function of the weight of the vehicle and to control automatic shifting between two or more gear ratios of the transmission in accordance with the modified at least one transmission shift point schedule.

The transmission may include a tailshaft coupled to at least one wheel of the vehicle. The control circuit may be configured to determine a throttle position as a function of user-requested fueling. The at least one transmission shift point schedule may comprise at least one default transmission shift point schedule defining transmission shift points between two or more gear ratios of the transmission as a function of the throttle position, rotational speed of the tailshaft and a vehicle weight that is one of or between a minimum weight of the vehicle and a maximum weight of the vehicle.

The at least one default transmission shift point schedule may comprise a default upshift schedule. The control circuit may be configured to execute the at least one set of instructions to modify the default upshift schedule by extrapolating the default upshift schedule to lower rotational speeds of the tailshaft than those of the default upshift schedule if the weight of the vehicle is below that upon which the default upshift schedule is based, and by extrapolating the default upshift schedule to higher rotational speeds of the tailshaft than those of the default upshift schedule if the weight of the vehicle is above that upon which the default upshift schedule is based.

A torque converter may be positioned between an internal combustion engine carried by the vehicle and the transmission. The torque converter may be operable in either of a lockup mode wherein a drive shaft of the engine is coupled directly to an input shaft of the transmission and a torque converter mode wherein the drive shaft of the engine is fluidly coupled to the input shaft of the transmission. The default upshift schedule may correspond to a default lockup upshift schedule when the torque converter is operating in lockup mode. The default upshift schedule may correspond to a normal default upshift schedule when the torque converter is operating in torque converter mode.

The at least one default transmission shift point schedule may comprise a default downshift schedule. The control circuit may be configured to execute the at least one set of instructions to modify the default downshift schedule by extrapolating the default downshift schedule to higher rotational speeds of the tailshaft than those of the default downshift schedule if the weight of the vehicle is above that upon which the default downshift schedule is based, and by extrapolating the default downshift schedule to lower rotational speeds of the tailshaft than those of the default downshift schedule if the weight of the vehicle is above that upon which the default downshift schedule is based. A torque converter may be positioned between an internal combustion engine carried by the vehicle and the transmission. The default downshift schedule may correspond to a default lockup downshift schedule when the torque converter is operating in lockup mode. The default downshift schedule may correspond to a normal default downshift schedule when the torque converter is operating in torque converter mode. An engine brake system may be configured when activated to selectively apply a retarding force to an internal combustion engine coupled to the transmission. The default downshift schedule may correspond to an engine brake default downshift schedule when the engine brake system is activated.

The at least one transmission shift point schedule may comprise a low speed shift point schedule defining transmission shift points between two or more gear ratios of the transmission as a function of accelerator pedal position, rotational speed of the tailshaft and a minimum weight of the vehicle, and a high speed shift point schedule defining transmission shift points between two or more gear ratios of the transmission as a function of throttle position, rotational speed of the tailshaft and a maximum weight of the vehicle, the low speed shift point schedule being defined at lower rotational speeds of the tailshaft than the high speed shift point schedule. The control circuit may be configured to modify the at least one transmission shift point schedule by extrapolating between the low speed shift point schedule and the high speed shift point schedule as a function of the weight of the vehicle.

The control circuit may be configured to execute the at least one set of instructions to control shifting between the two or more gear ratios of the transmission in accordance with the low speed shift point schedule if the weight of the vehicle is within a first threshold weight range of the minimum weight of the vehicle.

The control circuit may be configured to execute the at least one set of instructions to control shifting between the two or more gear ratios of the transmission in accordance with the high speed shift point schedule if the weight of the vehicle is within a second threshold weight range of the maximum weight of the vehicle.

A torque converter may be positioned between an internal combustion engine carried by the vehicle and the transmission. The torque converter may be operable in either of a lockup mode wherein a drive shaft of the engine is coupled directly to an input shaft of the transmission and a torque converter mode wherein the drive shaft of the engine is fluidly coupled to the input shaft of the transmission.

The low speed shift point schedule may correspond to a low speed lockup upshift schedule and the high speed shift point schedule may correspond to a high speed lockup upshift schedule when the torque converter is operating in lockup mode. The low speed shift point schedule may correspond to a low speed normal upshift schedule and the high speed shift point schedule may correspond to a high speed normal upshift schedule when the torque converter is operating in lockup mode. The low speed shift point schedule may correspond to a low speed lockup downshift schedule and the high speed shift point schedule may correspond to a high speed lockup downshift schedule when the torque converter is operating in lockup mode. The low speed shift point schedule may correspond to a low speed normal downshift schedule and the high speed shift point schedule may correspond to a high speed normal downshift schedule when the torque converter is operating in lockup mode. An engine brake system may be configured when activated to selectively apply a retarding force to an internal combustion engine coupled to the transmission. The low speed shift point schedule may correspond to a low speed engine brake downshift schedule and the high speed shift point schedule corresponds to a high speed engine brake downshift schedule when the engine brake system is activated.

A speed sensor may be configured to produce a speed signal corresponding to rotational speed of the tailshaft. A position sensor may be configured to produce a position signal corresponding to accelerator pedal position relative to a reference position. The control circuit may be configured to control automatic shifting of the transmission between the two or more gear ratios according to the modified at least one transmission shift point schedule based on the speed signal and the position signal.

A system for controlling shift points of a transmission coupled to an internal combustion engine and having a number of automatically selectable gear ratios may comprise a first control circuit configured to control operation of the engine and to determine a weight of a motor vehicle carrying the engine and the transmission, a memory unit having stored therein at least one transmission shift point schedule and at least one set of instructions, and a second control circuit configured to receive from the first control circuit data relating to the weight of the vehicle and to modify the at least one transmission shift point schedule as a function of the data. The second control circuit may be configured to execute the at least one set of instructions to control shifting between two or more of the automatically selectable gear ratios in accordance with the modified at least one transmission shift point schedule.

The system may further comprise a communications interface via which the first and second control circuits exchange information.

The transmission may include a tailshaft coupled to at least one wheel of the vehicle. The control circuit may be configured to determine a throttle position as a function of user-requested fueling. The at least one transmission shift point schedule may comprise at least one default transmission shift point schedule defining transmission shift points between two or more gear ratios of the transmission as a function of the throttle position, rotational speed of the tailshaft and a vehicle weight that is between a minimum weight of the vehicle and a maximum weight of the vehicle. The second control circuit may be configured to modify tailshaft rotational speed values of the at least one default transmission shift point schedule as a function of the weight of the vehicle relative to that upon which the at least one default transmission shift point schedule is based. Alternatively or additionally, the at least one transmission shift point schedule may comprise a low speed shift point schedule defining transmission shift points between two or more gear ratios of the transmission as a function of the throttle position, rotational speed of the tailshaft and a minimum weight of the vehicle, and a high speed shift point schedule defining transmission shift points between two or more gear ratios of the transmission as a function of the throttle position, rotational speed of the tailshaft and a maximum weight of the vehicle, the low speed shift point schedule being defined at lower rotational speeds of the tailshaft than the high speed shift point schedule. In this case, the second control circuit may be configured to extrapolate between the low speed shift point schedule and the high speed shift point schedule as a function of the weight of the vehicle.

A speed sensor may be configured to produce a speed signal corresponding to rotational speed of the tailshaft. A position sensor may be configured to produce a position signal corresponding to accelerator pedal position relative to a reference position. The second control circuit may be configured to control automatic shifting of the transmission between the two or more gear ratios according to the modified at least one transmission shift point schedule based on the rotational speed of the tailshaft and on the accelerator pedal position.

A method of controlling shift points of a transmission coupled to an internal combustion engine by modifying at least one transmission shift point schedule, wherein the transmission may have a number of automatically selectable gear ratios, may comprise determining a weight of a vehicle carrying the engine and the transmission, modifying the at least one transmission shift point schedule as a function of the weight of the vehicle, and controlling automatic shifting between two or more gear ratios of the transmission in accordance with the modified at least one transmission shift point schedule.

The method may further comprise storing in memory the at least one transmission shift point schedule in the form of at least one default transmission shift point schedule defining transmission shift points between two or more gear ratios of the transmission as a function of user-requested fueling in the form of a throttle position, rotational speed of the tailshaft and a vehicle weight that is one of or between a minimum weight of the vehicle and a maximum weight of the vehicle. Modifying at least one transmission shift point schedule may comprise modifying tailshaft rotational speed values of the at least one default transmission shift point schedule as a function of the weight of the vehicle relative to that upon which the at least one default transmission shift point schedule is based.

Alternatively or additionally, the method may further comprise storing in a memory unit the at least one transmission shift point schedule in the form of a low speed shift point schedule defining transmission shift points between two or more gear ratios of the transmission as a function of the throttle position, rotational speed of the tailshaft and a minimum weight of the vehicle, and a high speed shift point schedule defining transmission shift points between two or more gear ratios of the transmission as a function of the throttle position, rotational speed of the tailshaft and a maximum weight of the vehicle. The low speed shift point schedule may be defined at lower rotational speeds of the tailshaft than the high speed shift point schedule. Modifying at least one transmission shift point schedule may comprise extrapolating between the low speed shift point schedule and the high speed shift point schedule as a function of the weight of the vehicle. The method may further include controlling automatic shifting between two or more gear ratios of the transmission in accordance with the low speed shift point schedule if the weight of the vehicle is within a first threshold weight range of the minimum weight of the vehicle. The method may further include controlling automatic shifting between two or more gear ratios of the transmission in accordance with the high speed shift point schedule if the weight of the vehicle is within a second threshold weight range of the maximum weight of the vehicle. The first threshold weight may be different from the second threshold weight. Alternatively, the first threshold weight range may be equal to the second threshold weight range.

The method may further comprise determining a rotational speed of a tailshaft coupled to the transmission, determining a position of an accelerator pedal relative to a reference position, and controlling automatic shifting of the transmission between the two or more gear ratios in accordance with the modified at least one transmission shift point schedule based on the rotational speed of the tailshaft and on the accelerator pedal position.

BRIEF DESCRIPTION OF THE DRAWINGS

FIG. 2 is a flowchart of one illustrative embodiment of a software algorithm that is executable by the system of FIG. 1 to determine transmission shift points based on vehicle weight.

DESCRIPTION OF THE ILLUSTRATIVE EMBODIMENTS

For the purposes of promoting an understanding of the principles of the invention, reference will now be made to a number of illustrative embodiments shown in the attached drawings and specific language will be used to describe the same.

Figure 1:
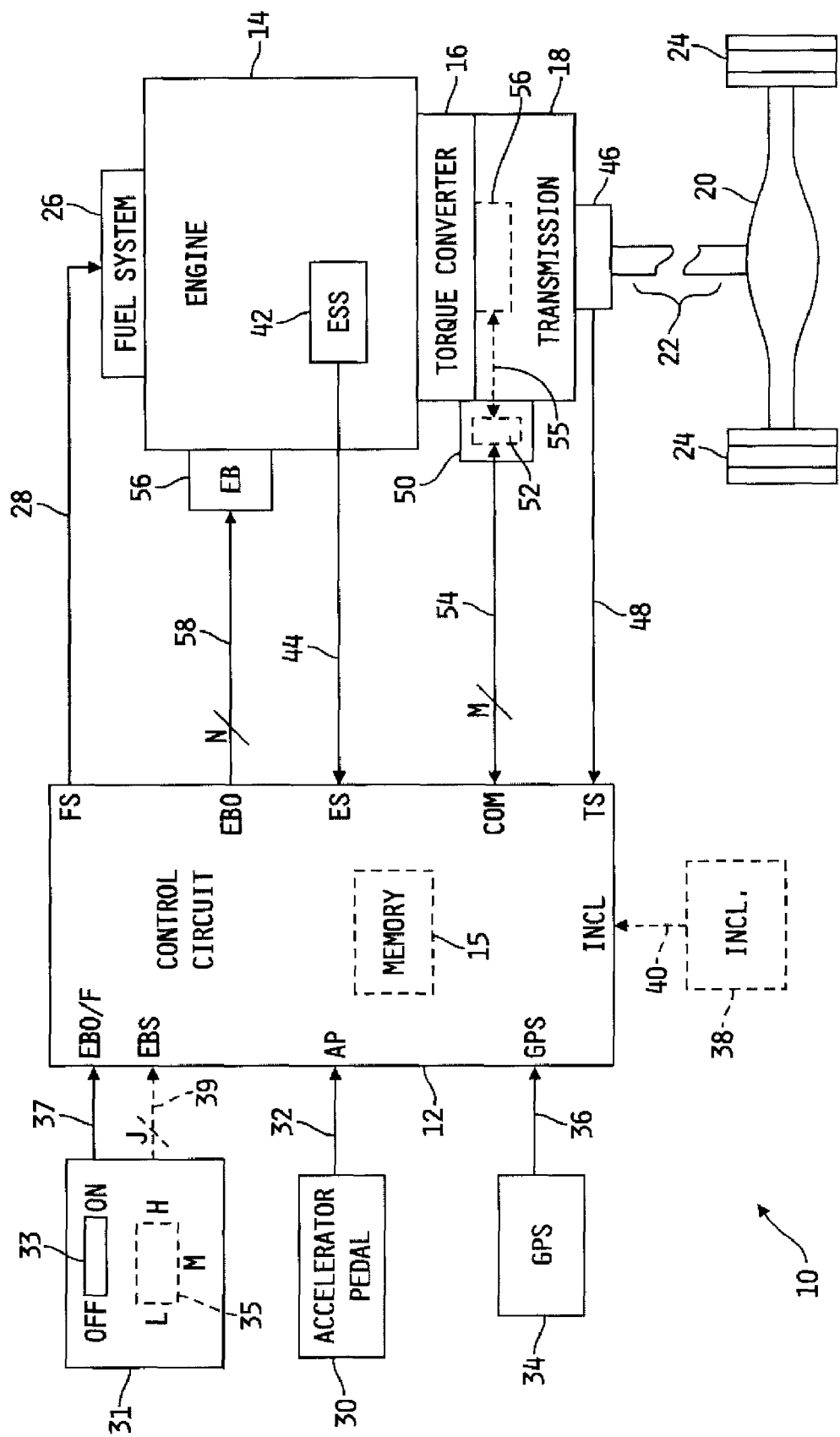
FIG. 1 is a block diagram of one illustrative embodiment of a system for determining transmission shift points based on vehicle weight.

Referring now to FIG. 1, one illustrative embodiment of a system 10 is shown for controlling transmission shift points as a function of vehicle weight. In the illustrated embodiment, the system 10 includes a control circuit 12 that includes a memory unit 15, and a number of digital and/or analog inputs/outputs. The control circuit 12 may illustratively be microprocessor-based, although other conventional types of control circuitry configured to operate as described herein may be used. The control circuit 12 is configured to execute one or more sets of instructions, such as in the form of one or more software algorithms, stored in a memory unit, and is generally operable to control and manage the overall operation of an internal combustion engine 14 in accordance with one or more such software algorithms. In this regard, the control circuit 12 is typically referred to in the internal combustion engine industry, as well as in the automotive, heavy, medium-duty and light-duty truck industries, as an electronic or engine control module or unit (ECM or ECU). In any case, the memory unit 15 of the control circuit 12 may include RAM, ROM, EPROM, EEPROM, FLASH memory and/or any other memory known to those skilled in the art.

The internal combustion engine 14 is operatively connected to a transmission 18 via a conventional torque converter 16, and the transmission is, in turn, operatively connected to a drive or propeller shaft 22 that will be referred to hereinafter, and in the claims appended hereto, as a transmission tailshaft 22. The tailshaft 22 is operatively connected to an axle 20 that is rotatably coupled to a number of vehicle wheels 24. The engine 14, torque converter 16, transmission 18, propeller shaft 22, axle 20 and wheels 24 define a vehicle driveline drivetrain or powertrain operable to transfer driving force supplied by the engine 14 to at least one of the wheels 24 as is known in the art.

The engine 14 includes a conventional fuel system 26 that is electrically connected to a fueling signal output, FS, of the control circuit 12 via a signal path 28. A conventional accelerator pedal 30, or other known manually-operated fuel requesting device, is electrically connected to an accelerator pedal, AP, of the control circuit 12 via a signal path 32, and is operable to provide a position signal on the signal path 30 indicative of accelerator pedal position, deflection or percentage relative to a reference position, deflection or percentage. In a manually-requested fueling mode, the control circuit 12 is responsive to the accelerator pedal position signal on signal path 32, as well as to a number of other engine/vehicle operating condition parameters, to determine an appropriate fueling command for supplying fuel to the engine 14 in a manner known in the art. In conventional cruise control mode, the control circuit 12 is alternatively responsive to one or more conventional cruise control signals to determine user-requested fueling and produce appropriate fueling commands, also in a manner that is known in the art. In either case, the control circuit 12 is configured to supply the fueling commands at the fuel signal output, FS, of the control circuit 12, and the fuel system 26 is, in turn, responsive to the fueling commands to supply fuel to engine 14 with corresponding quantity and timing. In any case, the accelerator pedal position signal and the one or more cruise control signals are typically processed by the control circuit 12 to determine a user-requested fueling signal that is typically referred to in the associated industry as a "throttle position" or "throttle percentage" value. These terms may be used hereinafter to refer to any of the accelerator pedal signal, the one or more cruise control signals and/or any other user-requested fueling value.

The engine 14 further includes a conventional engine brake 56 that is electrically connected to an engine brake output, EBO, of the control circuit 12 via a number, N, of signal paths 58, wherein N may be any positive integer. A conventional in-cab engine brake control panel 31 has a manually activated on/off switch 33 that is electrically connected to an engine brake on/off input, EBO/F, of the control circuit 12 via a signal path 37. The engine brake 56 may, in some embodiments, be provided in the form of a conventional engine compression brake. In such embodiments, the engine brake control panel 31 may further include a three or more position switch 35 that is electrically connected to an engine brake strength input, EBS, of the control circuit 12 via a number, J, of signal paths 39 wherein J may be any positive integer, as shown by dashed-line representation in FIG. 1. The control circuit 12 is configured, in a conventional manner, to activate the engine brake 56 when the on/off switch 33 is in the on position, and to deactivate the engine brake 56 when the on/off switch 33 is in the off position. When activated, the engine brake 56 applies a selectable retarding force, under certain operating conditions, to the engine 12 according to the engine braking strength or level selected via the switch 35. A low setting (L) sets the engine retarding force of the engine brake 56 at a low level or strength, a medium setting (M) sets the retarding force at a relatively medium level or strength, and a high setting (H) sets the retarding force at a relatively high level or strength. Various numbers of control switches may be used to control the level or strength of the engine retarding force applied by the engine brake 56, and the level or strength may have more or fewer divisions that that illustrated by example in FIG. 1. Alternatively or additionally, the engine brake 56 may be provided in the form of a conventional electronically controllable exhaust throttle disposed in-line with an exhaust gas conduit (not shown) that is fluidly coupled to an exhaust manifold (not shown) of the engine 14. Such an exhaust throttle is configured to be responsive to a control signal produced by the control circuit 12 to selectively restrict exhaust gas flow through the exhaust gas conduit, thereby imparting a retarding force on the engine 14. In this embodiment, the control circuit 12 is configured, in a conventional manner, to activate the engine brake 56 when the on/off switch 33 is in the on position, and to deactivate the engine brake 56 when the on/off switch 33 is in the off position. As the term "engine brake" is used herein, it will accordingly be understood to refer to either one or a combination of a conventional engine compression brake and a conventional exhaust throttle.

The system 10 further includes a number of sensors and/or sensing systems configured to provide the control circuit 12 with engine and/or vehicle operating information. For example, the vehicle includes a conventional global positioning system (GPS) unit 34 that is electrically connected to a vehicle position input, GPS, of the control circuit 12 via a number, L, of signal paths, wherein L may be any positive integer. The GPS unit is operable in a known manner to receive radio frequency signals from a number of earth-orbiting satellites, and the control circuit 12 is configured to process such radio frequency signals to determine latitudinal, longitudinal and altitudinal points corresponding to the current three-dimensional (3-D) position of the GPS unit, and hence the current 3-D position of the vehicle carrying the GPS unit 34. By continually monitoring changes in the altitudinal points in particular, the control circuit 12 may determine the grade of the road or other surface upon which the vehicle carrying the system 10 is traveling. It will be understood that in countries outside of the United States, and/or on continents other than North America, other conventional positioning systems developed for use in such other countries and/or on other continents may be used in place of the GPS unit 34 in the system 10. In other embodiments, the system 10 may alternatively or additionally include an inclinometer 38 or other road grade determining system that is electrically connected to an inclinometer input, INCL, via a signal path 40. In such embodiments, the inclinometer 38 or other road grade determining system is operable to produce a signal on the signal path 40 that corresponds to a current traveling angle of the vehicle carrying the system 10 relative to horizontal.

The system 10 further includes a conventional engine speed sensor 42 that is electrically connected to an engine speed input, ES, of the control circuit 12 via a signal path 44. The sensor 42 is operable to sense engine rotational speed, and to supply a corresponding engine speed signal on the signal path 44. A conventional tailshaft speed sensor 46 is electrically connected to a tailshaft speed input, TS, of the control circuit 12 via a signal path 48. The sensor 46 is operable to sense rotational speed of the tailshaft 22, and to supply a corresponding tailshaft speed signal on the signal path 48. In the illustrated embodiment, the sensor 46 is positioned adjacent to transmission 18, although the present disclosure contemplates locating the sensor 46 anywhere along the tailshaft 22 or axle 20, or alternatively still adjacent to any wheel 24 to sense wheel rotational speed. In cases where the sensor 46 is positioned adjacent to the axle 20 or any wheel 24, the control circuit 12 will include, for purposes of this disclosure, one or more conventional software algorithms for converting the rotational speed data produced by such a sensor to tailshaft rotational speed.

The transmission 18 generally includes a number of selectable gear ratios. In some embodiments, as illustrated by example in FIG. 1, the transmission 18 has a transmission control module 50 associated therewith, wherein the transmission control module 50 includes a control circuit 52 having an associated memory unit containing one or more software algorithms that are executed by the control circuit 52 to control automatic shifting between two or more of the selectable gear ratios. The control circuit 52 may illustratively be microprocessor-based, or may alternatively be any conventional electrical circuit or combination of electrical circuits operable as described hereinafter. In the illustrated embodiment, a speed sensor 56 is suitably positioned relative to an input shaft (not shown) of the transmission 18 or relative to an output shaft (not shown) of the torque converter 16, and is electrically connected to a transmission input shaft speed input of the control circuit 52 via a signal path 48. The sensor 56 is operable to sense rotational speed of the transmission input shaft (or torque converter output shaft), and to supply a corresponding transmission input shaft speed signal on the signal path 55.

The control circuit 12 further includes a communication (I/O) port, COM, that is electrically connected to a similar communication (I/O) port of the control circuit 52 via a communications link comprising a number, M, of signal paths 54, wherein M may be any positive integer. The control circuits 12 are each configured to communicate via the number of signal paths 54 in accordance with a known communications protocol. Illustratively, the communications protocol may be SAE J1939, although other communications protocols are contemplated. Examples of such alternative communications protocols include, but are not limited to, SAE J1587/J1708, CAN, or the like. In alternative embodiments, the number of signal paths 54 may be omitted, and the control circuits 12 and 52 may be configured in a conventional manner with suitable hardware and software to communicate via a wireless communications link in accordance with a conventional secure or non-secure communications protocol. In any case, the control circuits 12 and 52 are configured to share information via the communications link so that any information available to the control circuit 12 may be transmitted to, and received by, the control circuit 52, and any information available to the control circuit 52 may be transmitted to, and received by, the control circuit 12. In this manner, information relating to operation of the engine 12 and/or the vehicle carrying the engine 12 may be obtained by the control circuit 52, and information relating to the operation of the transmission 18 and/or torque converter 16 may be obtained by the control circuit 12.

The transmission 18 may take the form of any of a number of known embodiments having one or more automatically selectable gear ratios. For example, the transmission 18 may be a so-called manual/automatic, semiautomatic or automated manual transmission having one or more manually selectable gear ratios and a number of automatically selectable gear ratios. In some embodiments, the transmission 18 may include a manual gear shifting mechanism (not shown) for manually selecting certain gear ratios of the transmission 18, and the manual gear shifting mechanism may include an "automatic" position, whereby other gear ratios of the transmission 18 are automatically selectable. As another example, the transmission 18 may be a fully automatic transmission having a number of automatically selectable gear ratios and no manually selectable gear ratios.

With any such transmission 18 having automatically selectable gear ratios, the system 10 may include the torque converter 16 that is illustrated by example in FIG. 1. The torque converter 16 includes a conventional impeller (not shown) that is operatively connected to the output (drive) shaft of the engine 12 (not shown), and a conventional turbine (not shown) that is operatively connected to the input shaft (not shown) of the transmission 18. The impeller and turbine are positioned in a housing that typically contains a viscous fluid. The torque converter 16 is operable in a conventional manner such that under certain operating conditions, e.g., just before, during and just after gear shifting, the impeller and turbine may be coupled together only via the viscous fluid, and under other operating conditions, e.g., between gear shifts, the impeller and turbine are physically connected each other. In the former case, typically referred to as torque converter mode, the drive shaft of the engine 12 is thus fluidly coupled to the input shaft of the transmission 18, and in the latter case, typically referred to a lockup mode, the drive shaft of the engine 12 is coupled directly to the input shaft of the transmission 18. The control circuit 52 typically controls this conventional operation of the torque converter 16 as a function of at least the speed signals produced by the sensor 42 and 46.

The transmission control circuit 52 is typically operable to control shifting between the automatically selectable gear ratios of the transmission 18, and to share appropriate information relating thereto with the control circuit 12 via the communications link 54. Alternatively, the control circuit 12 may be configured in some embodiments to control shifting between the automatically selectable gear ratios of transmission 18. In either case, both the control circuit 12 and transmission control circuit 52 are configured to transmit and receive operational information via communications link 54, wherein such operational information may be in the form of instantaneous operational data, accumulated operational data, functional requests and/or commands, and the like.

In any case, the memory unit associated with the control circuit 12 or 52 that controls operation of the transmission 18 and torque converter 15, includes one or more software algorithms that are executed by the control circuit 12 or 52 to control shifting between the automatically selectable gear ratios of the transmission 18 in accordance with one or more transmission shift point schedules stored in the associated memory unit. As one example, which should not be considered to limit any of the concepts described herein, the associated memory unit may include five different shift point schedules; one each for normal upshifting and downshifting between two or more automatically selectable gear ratios of the transmission, wherein "normal" corresponds to the torque converter mode of operation of the torque converter 16, one each for lockup upshifting and downshifting between two or more automatically selectable gear ratios of the transmission 18, wherein "lockup" corresponds to the lockup mode of operation of the torque converter 16, and one for downshifting between two or more automatically selectable gear ratios of the transmission 18 when the engine brake 56 is activated, e.g., when the on/off switch 33 is in the on position. In other embodiments, the memory unit associated with the control circuit that controls shifting between the automatically selectable gear ratios of the transmission 18 may include more or fewer transmission shift point schedules to control upshifting and/or downshifting under correspondingly more or fewer and/or different operating conditions.

One example of a conventional transmission shift point schedule defines transmission shift points as a functional relationship between throttle percentage, as this term is described hereinabove, and tailshaft rotational speed, for upshifts and/or downshifts between each of the automatically selectable gear ratios of the transmission 18. Specific examples of a number of such transmission shift point schedules will be illustrated and described hereinafter with respect to FIGS. 5-9. It will be appreciated that transmission shift point schedules may be defined differently in other embodiments, and any such definition or functional relationship(s) that trigger(s) shifting between automatically selectable gear ratios of the transmission 18 are contemplated by this disclosure.

Transmission shift point schedules of the type just described by example are conventionally developed relative to a target vehicle weight. In passenger cars, for example, the target vehicle weight may be near the build weight of the vehicle, since passenger cars typically are not designed to carry substantial extra weight. In the heavy duty truck industry, in contrast, the target weight may be some weight between a minimum vehicle weight or so-called curb weight (CW), i.e., the weight of the truck as built and without a trailer attached, and a maximum or so-called gross vehicle weight rating (GVWR), i.e., the maximum weight of a truck/trailer combination with the trailer fully loaded, since the total weight of such vehicles typically varies between these two extremes. In the medium and light duty truck industries, in further contrast, two sets of transmission shift point schedules may be provided. A first set may correspond to a target vehicle weight that is near the build weight of the vehicle, and a second set may correspond to a target vehicle weight that is closer to a weight of the vehicle when carrying its maximum capacity. In such embodiments, a manually-selectable switch may be provided, e.g., in the cab area of the vehicle, that allows the user to manually switch between the first and second sets of transmission shift point schedules depending upon the load being carried by the vehicle. It is desirable in any heavy duty, medium duty and/or light duty truck application, in any automotive application, and/or in other motor vehicle applications having a transmission that includes at least one automatically selectable gear ratio, to provide for the automatic control of transmission shift points as a function of current vehicle weight.

Referring now to FIG. 2A, a flowchart is shown of one illustrative embodiment of a software algorithm 60 that is executable by the system 10 of FIG. 1 to control shift points of the transmission 18 based on the current weight of the vehicle. In one embodiment, the software algorithm 60 is stored in the memory unit associated with the control circuit 52, and is executed by the control circuit 52 to control shifting between automatically selectable gear ratios of the transmission 18. The algorithm 60 will accordingly be described with respect to FIG. 2A as being executed by the control circuit 52 except where noted. In this embodiment, as will be described in greater detail hereinafter, the current weight of the vehicle is determined by the control circuit 12, and the corresponding vehicle weight information is provided to the control circuit 52 via the communications link 54. Alternatively, the weight of the vehicle may be determined by the control circuit 52 based on information relating to the operation of the engine 12 and/or the vehicle carrying the system 10 via the communication link 54. In an alternative embodiment, the software algorithm 60 may be stored in the memory unit 15, and may be executed by the control circuit 12 to control shifting between automatically selectable gear ratios of the transmission 18. In this embodiment, the control circuit 12 is operable to provide shifting commands to the control circuit 52 from which the control circuit 52 controls the actual shifting process. Alternatively, the control circuit 12 may be operable to completely control shifting between automatically selectable gear ratios of the transmission 18 in embodiments that do not include the control circuit 52 and the transmission control module 50. In any case, a memory unit associated with the control circuit 52 and/or the memory unit 15 has stored therein at least one set of instructions that is/are executable by the control circuit 52, or alternatively the control circuit 12, to control shifting between the automatically selectable gear ratios of the transmission 18 in accordance with the software algorithm 60.

The algorithm 60 begins at step 62, and at step 64 one or more low tailshaft speed shift point schedules, LSPS, based on a minimum weight of the vehicle carrying the system 10, is/are established. Thereafter at step 66, one or more high tailshaft speed shift point schedules, HSPS, based on a maximum weight of the vehicle carrying the system 10, is/are established. The one or more low tailshaft speed shift point schedules, LSPS, is/are determined in a conventional manner, as described hereinabove, wherein the target vehicle weight is the curb weight, CW, corresponding to a load-free weight of the vehicle as delivered from the vehicle manufacturer, or other low vehicle weight that is greater than the load-free weight of the vehicle. The one or more high tailshaft speed shift point schedules, HSPS, is/are also determined in a conventional manner, as described hereinabove, wherein the target vehicle weight is the gross vehicle weight rating, GVWR, corresponding to the maximum total weight of the vehicle carrying its maximum allowable load, or other high vehicle weight that is less than the maximum load vehicle weight. It will be understood that CW and/or GVWR will typically depend on the weight capacities of the various components of the vehicle, and may therefore vary even among vehicle make and/or model. In the illustrated embodiment, LSPS and HSPS are "established" by storing the one or more corresponding LSPS and HSPS shift point schedules in the memory unit associated with the control circuit that is executing the algorithm 60. Alternatively, LSPS and HSPS may be established by storing LSPS and HSPS in a memory unit that is not associated with the control circuit that is executing the algorithm 60 but that is accessible, e.g., via wired, wireless, satellite, cellular, internet (e.g., WWW) or other communications, by the control circuit that is executing the algorithm 60.

Following step 66, the algorithm 60 advances to step 68 where the current weight (VW) of the vehicle carrying the system 10 is determined. It will be understood that while steps 64, 66 and 68 involve information that is based on vehicle weight, they may alternatively be modified to involve information that is based on vehicle mass. For purposes of this disclosure, the terms "vehicle weight" and "weight of the vehicle" used herein will be understood to refer to either the actual weight of the vehicle in suitable units of weight measure or the mass of the vehicle in suitable units of mass measure. In the illustrated embodiment, step 68 is executed by the control circuit 12, and the vehicle weight value, VW, is provided to the control circuit 52 via the communication link 54. Alternatively, as described hereinabove, VW may be determined by the control circuit 52 based on vehicle and/or engine operating information supplied by the control circuit 12. In either case, the vehicle weight value, VW, may be computed asynchronously with respect to the execution of the algorithm 60, and the vehicle weight value may therefore not be re-computed each time the algorithm 60. In such cases, step 68 of the algorithm 60 may be executed by simply monitoring or determining the currently or most recently computed vehicle weight value, VW.

Figures 3A, 3B:
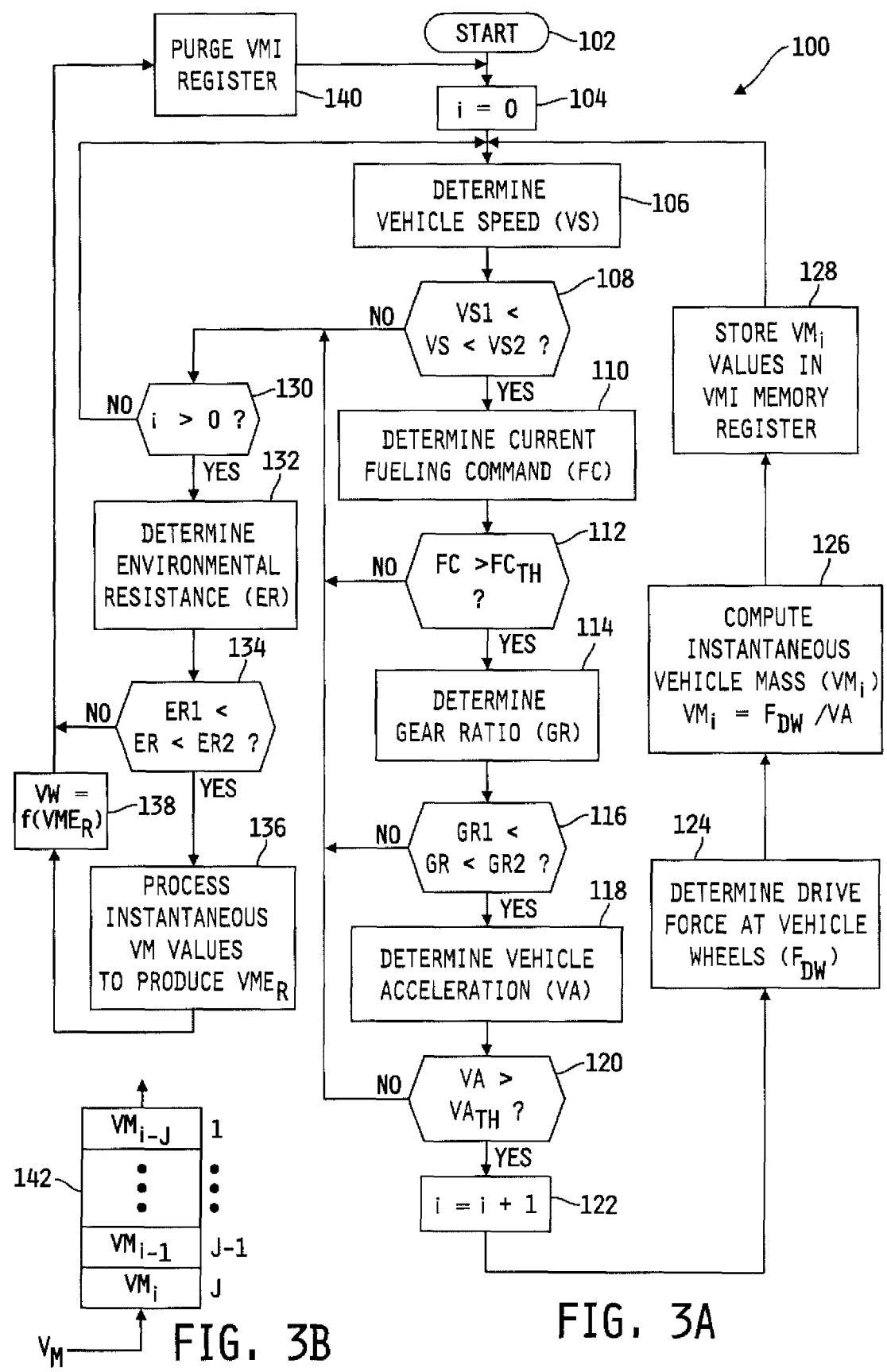
FIG. 3A is a flowchart of one illustrative embodiment of a software routine that is executable by the system of FIG. 1 to estimate vehicle weight according to one of the steps of the software algorithm of FIG. 2.
FIG. 3B is a diagrammatic illustration of a memory block demonstrating one illustrative technique for storing instantaneous vehicle mass estimates produced by the software routine of FIG. 3A.

Referring now to FIG. 3A, a flowchart of one illustrative embodiment of a software routine 100 is shown for carrying out step 68 of the algorithm 60 by estimating the weight, VW, of the vehicle carrying the system 10. In the illustrated embodiment, the routine 100 is executed by the control circuit 12, and the resulting vehicle weight estimate is passed to the control circuit 52 via the communications link 54, as described hereinabove. The routine 100 begins at step 102 and at step 104, the control circuit 12 is operable to set a counter value, i, equal to a predetermined count value; e.g., zero. Thereafter at step 106, the control circuit 12 is operable to determine a vehicle speed value VS. In one embodiment, the control circuit 12 is operable to execute step 106 by reading the instantaneous value of the tailshaft rotational speed sensor 46 and converting this value to a vehicle road speed value in a conventional manner. Alternatively, control circuit 52 may be configured to determine information relating to vehicle road speed from the tailshaft speed sensor 46, and provide this information or the tailshaft speed information alone to control circuit 12 via the communications link 54. The control circuit 12 is operable to convert such information, as necessary, to a vehicle road speed value in a known manner.

Following step 106, execution of the routine 100 advances to step 108 where the control circuit 12 is operable to compare the vehicle road speed value, VS, to lower and upper road speed threshold values VS1 and VS2 respectively. It is desirable to estimate vehicle mass, m, under favorable conditions, and one such favorable condition is vehicle road speed being within a range of desirable road speed values. At road speeds below the range of desirable road speed values, the forces required to overcome inertial forces of rotating components in the vehicle drive line have a significant effect upon vehicle drive force and vehicle acceleration, and such inertial forces may be typically difficult to model. Likewise, at road speeds above the range of desirable road speed values, environmental factors such as vehicle aerodynamic drag force and the like, which are also difficult to model, tend to have a stronger impact on vehicle drive force and vehicle acceleration than at slower vehicle road speeds. Accordingly, the lower and upper road speed threshold values VS1 and VS2 are established so that the foregoing adverse effects on vehicle drive force and vehicle acceleration in the vehicle road speed range defined therebetween are minimized. Those skilled in the art will recognize that VS1 and VS2 are at least somewhat dependent upon the engine/driveline configuration as well as the configuration of the vehicle itself, and these factors should be considered when choosing the VS1 and VS2 values. In any case, referring back to the routine 100, if the instantaneous vehicle road speed value VS is between VS1 and VS2, execution of the routine 100 advances to step 110. Otherwise execution of the routine 100 advances to step 130.

If the vehicle road speed condition of step 108 is satisfied, the control circuit 12 is operable at step 110 to determine a current fueling command value FC. In embodiments where the routine 100 is executed by control circuit 12, the control circuit 12 is operable to compute the fueling command values as described hereinabove, and therefore has ready access to such information. In alternate embodiments where the routine 100 is executed by the control circuit 52, the control circuit 52 may execute step 110 by monitoring the communications link 54 for fueling command information broadcast by control circuit 12. In any case, the routine 100 advances from step 110 to step 112 where the control circuit 12 is operable to compare the current fueling command value FC with a fueling command threshold $FC_{TH}$. Illustratively, $FC_{TH}$ reflects a fueling command value above which the engine 14 is being worked adequately to efficiently accelerate the vehicle carrying the engine 14. In any case, if the current fueling command value FC is above $FC_{TH}$, execution of the routine 100 advances to step 114, and otherwise advances to step 130.

At step 114, the control circuit 12 is operable to determine a currently engaged gear ratio, GR, of the transmission 18. Illustratively, the control circuit 52 is operable in a conventional manner to determine the currently engaged gear ratio, GR, and to broadcast GR onto the communications link 54. Alternatively, the control circuit 12 may be configured to determine GR in a conventional manner and based on information relating to the operation of the transmission 18 that is received from the control circuit 52. In any case, execution of the routine 100 advances from step 114 to step 116 where the control circuit 12 is operable to compare the gear ratio value GR to lower and upper gear ratio values GR1 and GR2 respectively. Another of the favorable conditions for estimating vehicle mass is a desirable range of gear ratios. At gear ratios above the desirable range of gear ratios (corresponding to the numerically lower transmission gears; e.g. 1st, 2nd, etc. gears), the forces required to overcome inertial forces of rotating components in the vehicle driveline have a significant effect upon vehicle drive force and vehicle acceleration, and such inertial forces are typically difficult to model. Likewise, at gear ratios below the desirable range of gear ratios (corresponding to the numerically higher transmission gears), environmental factors such as vehicle aerodynamic drag force, rolling resistance and the like, which are also difficult to model tend to have a stronger impact on vehicle drive force and vehicle acceleration than at higher gear ratios. Illustratively, the lower and upper gear ratio values GR1 and GR2 are established so that the foregoing adverse effects on vehicle drive force and vehicle acceleration in the gear ratio range defined therebetween are minimized. If GR is within the gear ratio range defined by GR1 and GR2, execution of the routine 100 advances to step 118, and otherwise advances to step 130.

At step 118, the control circuit 12 is operable to determine an instantaneous vehicle acceleration value VA. Illustratively, the control circuit 12 is operable to determine the instantaneous vehicle acceleration value VA as a well-known function of vehicle road speed, wherein the vehicle road speed may be provided according to any of the techniques described hereinabove with respect to step 106. Execution of the routine 100 advances from step 118 to step 120 where the control circuit 12 is operable to compare the instantaneous vehicle acceleration value VA to a vehicle acceleration threshold value $VA_{TH}$. If the instantaneous vehicle acceleration value, VA, is greater than $VA_{TH}$, execution of the routine 100 advances to step 122. If, on the other hand, VA is not greater than $VA_{TH}$ at step 120, execution of the algorithm 100 advances to step 130.

Steps 106-120 of the routine 100 represent a number of illustrative preconditions to be satisfied before computing vehicle mass estimates in accordance with the present invention. However, it should be understood that alternate embodiments of the routine 100 are contemplated that require more, fewer and/or different preconditions that those represented by steps 106-120. In any case, if, at step 120, the control circuit 12 determines that VA is greater than $VA_{TH}$, execution of the routine 100 advances to step 122 where the counter value, i, is incremented by one. Thereafter at step 124, the control circuit 12 is operable to determine an instantaneous drive force $F_{DW}$ at the vehicle wheels.

Figure 4:
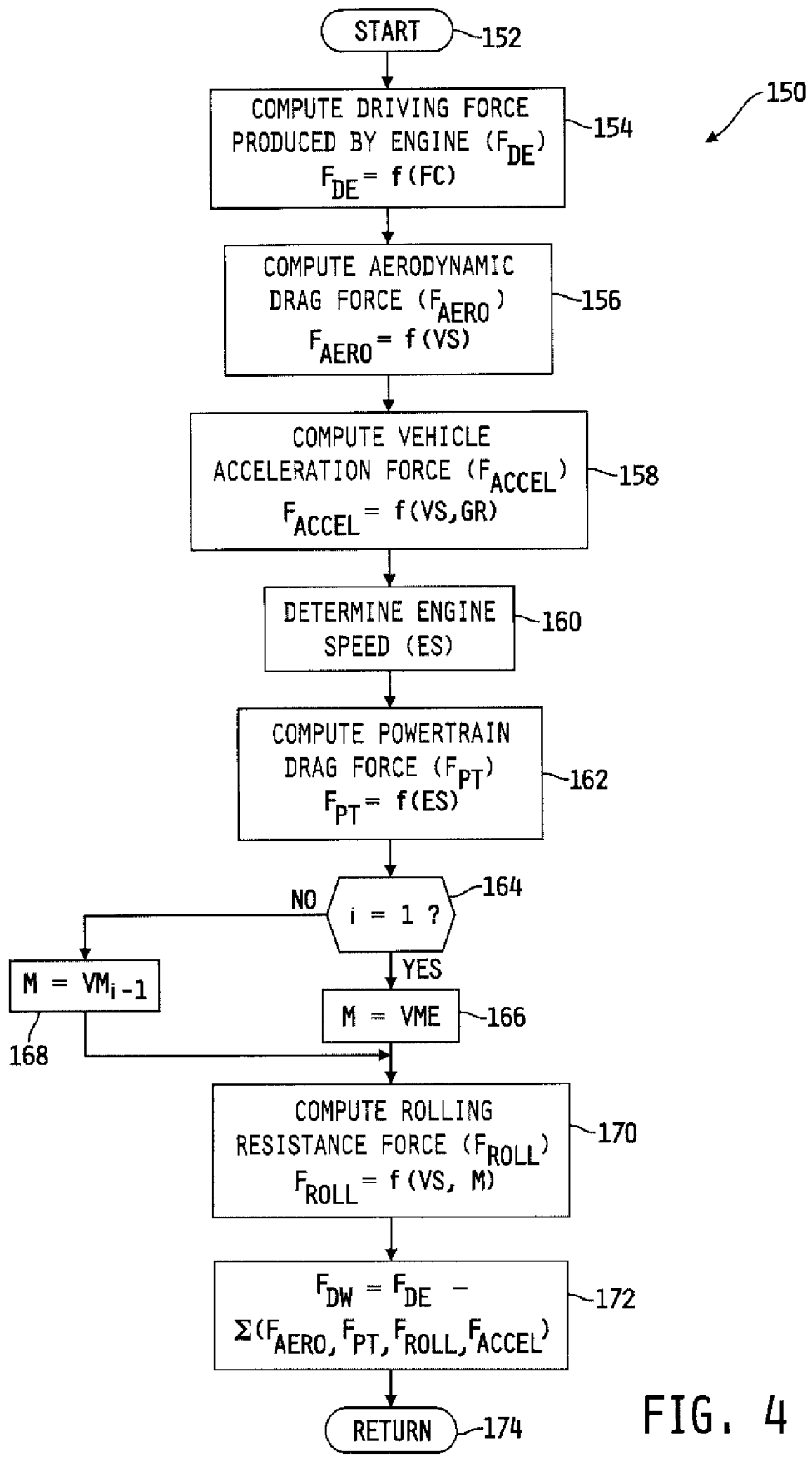
FIG. 4 is a flowchart of one illustrative embodiment of a software routine that is executable by the system of FIG. 1 to determine a net driving force at the wheels of the vehicle according to one of the steps of the software routine of FIG. 3A.

Referring now to FIG. 4, one illustrative embodiment of a software routine 150 for carrying out step 124 of the routine 100 of FIG. 3A is shown. The routine 150 begins at step 152, and at step 154 the control circuit 12 is operable to compute a driving force $F_{DE}$ produced by the engine 14. Illustratively, the control circuit 12 is operable to determine $F_{DE}$ as a function of the current fueling command value FC, in accordance with well-known equations Following step 154, the routine 150 advances to step 156 where the control circuit 12 is operable to compute an aerodynamic drag force $F_{AERO}$, on the vehicle carrying the system 10. Illustratively, the control circuit 12 is operable to compute $F_{AERO}$ as a function of vehicle speed VS, and one example function is the equation $F_{AERO}=0.5*p*A_F*K_{AERO}*VS^2$, wherein "p" is the density of ambient air, "$A_F$" is the frontal area of the vehicle and $K_{AERO}$ is an aerodynamic drag coefficient. The parameters "p", "$A_F$" and "$K_{AERO}$" may be stored as constants in the memory unit 15 of the control circuit 12. It is to be understood, however, that the aerodynamic drag force, $F_{AERO}$, may alternatively be computed at step 156 according to one or more other known equations, and that any such alternative computational strategies are intended to fall within the scope of this disclosure.

Following step 156, the control circuit 12 is operable to compute a vehicle resistance to acceleration force $F_{ACCEL}$. Illustratively, the control circuit 12 is operable to compute $F_{ACCEL}$ as a function of vehicle speed VS and gear ratio GR. In general, vehicle resistance to acceleration force may be defined by the equation $F_{ACCEL}=M_i*VS$, wherein $M_i$ is the mass due to inertia of the rotating components of the vehicle powertrain, and wherein $M_i=(Ie*GR^2*RAR^2)/R^2$. In this equation, "Ie" is engine inertia, "GR" transmission gear ratio, "RAR" is the rear axle ratio and "R" is the radius of the tires. The parameters "R", "RAR" and "Ie" may be stored as constants in the memory unit 15 of the control circuit 12. It is to be understood, however, that the vehicle resistance to acceleration force, $F_{ACCEL}$, may alternatively be computed at step 158 according to one or more other known equations, and that any such alternative computational strategies are intended to fall within the scope of this disclosure.

Following step 158, the control circuit 12 is operable at step 160 to determine a current rotational speed, ES, of the engine 12. Illustratively, the control circuit 12 is operable to determine the engine rotational speed, ES, by monitoring the signal produced by engine speed sensor 32. Execution of the routine 150 advances from step 160 to step 162 where the control circuit 12 is operable to compute a powertrain drag force $F_{PT}$. Illustratively, the control circuit 12 is operable to compute the powertrain drag force, $F_{PT}$, as a function of engine speed ES. In one embodiment, the control circuit 12 is operable at step 162 to compute the powertrain drag force by taking into account resistive forces due to engine accessory use as well as powertrain mechanical efficiencies including friction (i.e., bearing, seal face, etc.), gear mesh, spin, churning and windage. Those skilled in the art will recognize that the powertrain drag force term, $F_{PT}$, may be calculated according to a number of known techniques and may include any number of desired terms corresponding to any number of engine accessory and/or powertrain mechanical components. For example, the engine alternator (not shown) is known to require constant power independent of engine speed, whereas engine cooling fan loss is proportional to $ES^3$, air conditioning loss, if an air conditioning unit (not shown) is activated, is proportional to $ES^2$, power steering loss is proportional to $ES^2$, and so forth. Illustratively, equations and/or constants relating to such components of $F_{PT}$ may be stored within the memory unit 15, and one or more terms making up $F_{PT}$ are computed by the control circuit 12 as a known function of engine speed. Alternatively, an estimate of $F_{PT}$ may be stored within the memory unit 15 as a constant, and recalled by the control circuit 12 when executing step 162. It is to be understood, however, that the powertrain drag force term, $F_{PT}$, may be computed at step 162 according to one or more known equations, and that any such computational strategies are intended to fall within the scope of this disclosure.

From step 162, the routine 150 advances to step 164 where the control circuit 12 tests the counter, i, to determine whether the vehicle drive force sample currently being determined is the first in a set of samples. If so, i=1 and the routine 150 advances to step 166 where a mass value, M, is set to the current vehicle estimate value VME (i.e., the current vehicle mass estimate resulting from one or more traversals of algorithm 100). If the vehicle drive force sample currently being determined is an intermediate sample in a set of samples, i is greater than 1 and the routine 150 therefore advances to step 168 where the mass value, M, is set to the previously determined vehicle mass value $VM_{i-1}$ (i.e., the vehicle mass value computed in the previous iteration of algorithm 100). From either of steps 166 or 168, the routine 150 advances to step 170 where the control circuit 12 is operable to compute a rolling resistance force $F_{ROLL}$. Illustratively, the control circuit 12 is operable at step 170 to compute the rolling force, $F_{ROLL}$, as a function of vehicle speed, VS, and the mass value, M, resulting from either of steps 166 or 168. In one embodiment, the rolling resistance force is computed by the control circuit 12 at step 170 according to the equation $F_{ROLL} = (K_{STATIC} + K_{DYNAMIC} * VS) * VM$, wherein "$K_{STATIC}$" is a static rolling resistance coefficient and "$K_{DYNAMIC}$" is a dynamic rolling resistance coefficient. Illustratively, "$K_{STATIC}$" and "$K_{DYNAMIC}$" may be stored as constants in the memory unit 15 of the control circuit 12. It is to be understood that the rolling resistance force $F_{ROLL}$ may alternatively be computed at step 170 according to one or more other known equations, and that any such alternative computational strategies are intended to fall within the scope of this disclosure.

Following step 170, the routine 150 advances to step 172 where the control circuit 12 is operable to compute the vehicle drive force $F_{DW}$ as a difference between the drive force produced by the engine, $F_{DE}$, and the sum of the resistive forces, i.e., the sum of $F_{AERO}$, $F_{ACCEL}$, $F_{PT}$ and $F_{ROLL}$. Thereafter at step 174, the routine 150 returns to step 124 of the routine 100. This disclosure contemplates that any one or more of the resistance forces $F_{AERO}$, $F_{ACCEL}$, $F_{PT}$ and $F_{ROLL}$ computed in the routine 150 may alternatively be stored in memory as one or more constants. Corresponding steps of the routine 150 may accordingly be modified such that the resistance force(s) are recalled from the memory unit 15 rather than computed as illustrated in FIG. 4.

Referring again to FIG. 3A, the routine 100 advances from step 124 to step 126 where the control circuit 12 is operable to compute an instantaneous vehicle mass estimate, $VM_i$, as a ratio of the vehicle drive force value, $F_{DW}$, computed at step 124 and the vehicle acceleration value, VA, determined at step 118. Thereafter at step 128, the control circuit 12 is operable to store the $VM_I$ value computed at step 126 into an instantaneous vehicle mass (VMI) register within the memory unit 15. Thereafter, the routine 100 loops back to step 106 to ensure that all of the preconditions of steps 106-120 are still satisfied for the current acceleration event before computing another vehicle mass estimate $VM_i$.

Referring now to FIG. 3B, one illustrative embodiment of a VMI register 142 described with respect to step 128 of the routine 100 of FIG. 3A is shown. Illustratively, the register 142 is configured to maintain only up to a predefined number of VM samples computed near the end of an acceleration sequence defined by any of the preconditions of steps 106-120 to thereby avoid subsequent inaccurate vehicle mass estimates due to elastic driveline effects such as the spring rate of driveline components, and other effects such as backlash of the powertrain system, and the like. In one embodiment, for example, the register 142 is configured to hold "J" samples, wherein J may be any positive integer (e.g., 50). The VMI register 142 is configured in this embodiment as a queue storing each newly computed vehicle mass value in the Jth position, and shifting all previously stored mass values one position toward the J=1 position. In this manner, the register 142 is configured to maintain only the J most recent VM samples $VM_i - VM_{i-j}$.

Referring again to FIG. 3A, if the tested preconditions at any of steps 108, 112, 116 are not met, execution of the routine 100 advances from any of these steps to step 130 where the control circuit 12 tests the count value, i. If i is not greater than zero, this indicates that at least one of the preconditions of steps 106-120 has not yet been met, and therefore that no instantaneous vehicle mass samples $VM_i$ are currently available. This will be true when the vehicle is currently not undergoing an acceleration event or if any one of the preconditions of steps 106-120 has not yet been met for the current acceleration event. In either case, the routine 100 loops back to step 106. If, however, i is greater than zero at step 130, this indicates that at least one of the preconditions of steps 106-120 is no longer met, and that the current vehicle acceleration event has terminated. In this case, execution of the routine 100 advances to step 132 where the control circuit 12 is operable to determine an environmental resistance factor ER. Illustratively, ER represents an accumulative effect of one or more environmental forces/conditions acting upon the vehicle carrying the engine 14 that may corrupt or otherwise cause the various instantaneous vehicle mass estimates $VM_i$ to be inaccurate. Examples of such environmental forces/conditions include, but are not limited to, road grade variations (e.g., positive and/or negative road grades), road conditions (e.g., road composition, weather conditions, etc.), wind force (from any direction), and the like. In one embodiment, the control circuit 12 is operable at step 132 to determine the environmental resistance factor, ER, as a function of the road grade determined via the GPS altitudinal information described above. Alternatively or additionally, the road grade information may be obtained, or supplemented, by information produced by the optional inclinometer 38. Alternatively still, the environmental resistance factor, ER, may include road composition information, weather condition information, wind force information, and/or the like.

Following step 132, the routine 100 advances to step 134 where the control circuit 12 is operable to test the environmental resistance factor, ER, against a threshold value, $ER_{TH}$. In one embodiment, $ER_{TH}$ is set to a road grade value above which it is not desirable to include the vehicle mass values $VM_i$–$VM_{i-j}$ in the running vehicle mass estimate value. Alternatively, $ER_{TH}$ may include additional factors relating to road composition, weather condition information, wind force, and the like. If, at step 134, ER is less than $ER_{TH}$, meaning that the road grade (incline or decline) is acceptable for including the vehicle mass values $VM_i$–$VM_{i-j}$ in the running vehicle mass estimate value, execution of the routine 100 advances to step 136. Otherwise, the routine 100 advances to step 140 where the control circuit 12 purges or erases the contents of the VMI register 142. From step 140, the routine 100 loops back to step 104.

At step 136, the control circuit 12 is operable to process the instantaneous vehicle mass values, $VM_i$, stored within the register 140. In one embodiment, the control computer 12 maintains a running value of the vehicle mass estimate, $VME_R$, and the control circuit 12 is operable at step 136 to include the instantaneous vehicle mass values, $VM_i$, in the running estimate, $VME_R$, using a conventional averaging technique. The effect of the $VM_i$ values on the running vehicle mass estimate value, $VME_R$, may be weighted in a manner that determines the rate at which the running vehicle mass estimate. In any case, execution of the routine 100 advances from step 136 to step 138 where the control circuit 12 determines the vehicle weight, VW, as a function of the running vehicle mass estimate, $VME_R$. As described hereinabove, the vehicle weight, VW, may be either the actual weight of the vehicle carrying the system 10 or may alternatively be the running vehicle mass estimate value, $VME_R$. In the former case, the control circuit 12 is operable to compute VW as a known function of $VME_R$, and in the latter case the control circuit 12 is operable at step 138 to simply set VM=$VME_R$. In cases where VW is the actual weight of the vehicle carrying the system 10, all shift point schedules relied upon and produced by the algorithm 60 of FIG. 2A (or the algorithm 85 of FIG. 2B) will be based on vehicle weight information (e.g., target and computed vehicle weight values), and in cases where VW is the estimated vehicle mass, $VME_R$, all shift point schedules relied upon and produced by the algorithm 60 of FIG. 2A (or the algorithm 85 of FIG. 2B) will be based on vehicle mass information (e.g., target and estimated vehicle mass values). Further details relating to the foregoing example process for determining the weight of the vehicle, VW, in accordance with step 68 of the algorithm 60 of FIG. 2A are set forth in U.S. Pat. No. 6,567,734, which is assigned to the assignee of this disclosure, and the disclosure of which is incorporated herein by reference. The process detailed in U.S. Pat. No. 6,567,734 pertains primarily to vehicles having a transmission that includes manually selectable gear ratios, and includes process steps that determine when the vehicle is traversing a grade and that discard collected data when it is determined that the vehicle is traversing a grade. Similar techniques may be used when the transmission includes an automatic transmission. For example, by monitoring the transmission tailshaft speed, the change in engine rotational speed, the pressure applied to the clutch and the change in applied clutch pressure, all of which are readily monitorable operating conditions, the grade being traversed by the vehicle may be determined. Force and acceleration information collected during operation on such grades may then be discarded from the vehicle mass or weight calculation as detailed in the disclosure of U.S. Pat. No. 6,567,734. It will be understood that other known processes for determining the weight of the vehicle, VW, may alternatively be used at step 68. Examples include, but are not limited to, other known processes for estimating vehicle weight or mass, and physically weighing the vehicle using a suitable on-vehicle or off-vehicle weighing structure or system. In the case of physically weighing the vehicle, step 68 may be executed by weighing the vehicle carrying the system 10 to determine a current weight of the vehicle, followed by entering the current weight of the vehicle into the control circuit 12. In this case, the system 10 will typically include one or more known electronic structures and/or mechanisms that is/are in wired or wireless communications with the control circuit 12 and that is/are configured to allow automatic or manual entry of vehicle weight data into the control circuit 12. Examples include, but are not limited to, cellular telephones, conventional hand-held wireless devices, conventional in-vehicle electronic engine/vehicle monitoring systems, conventional service/recalibration tools, dedicated in-vehicle, electronic vehicle weight-selection devices, and the like.

Referring again to FIG. 2A, execution of the algorithm 60 advances from step 68 to step 70 where the control circuit 52 is operable to determine whether the current weight of the vehicle, VW, determined at step 68 is within a first weight range threshold, $W_{TH1}$, of the minimum weight, MINW, of the vehicle. If so, algorithm execution advances to step 72 where the control circuit 52 is operable to set one or more current shift point schedule(s), CSPS, equal to the one or more corresponding low tailshaft speed shift point schedule(s) LSPS. If, at step 70, the control circuit 52 determines instead that the weight of the vehicle, VW, is not within $W_{TH1}$ of MINW, execution of the algorithm 60 advances to step 74 where the control circuit 52 is operable to determine whether the current weight of the vehicle, VW, determined at step 68 is within a second weight range threshold, $W_{TH2}$, of the maximum weight, MAXW, of the vehicle. If so, algorithm execution advances to step 76 where the control circuit 52 is operable to set the one or more current shift point schedule(s), CSPS, equal to the one or more corresponding high tailshaft speed shift point schedule(s) HSPS. If, at step 74, the control circuit 52 determines instead that the weight of the vehicle, VW, is not within $W_{TH2}$ of MAXW, execution of the algorithm 60 advances to step 78. In one embodiment, $W_{TH1}$=$W_{TH2}$, and in other embodiments, $W_{TH1}$≠$W_{TH2}$.

At step 78, the control circuit 52 is operable to determine the one or more current shift point schedule(s) by modifying either or a combination of the one or more corresponding low and high tailshaft speed shift point schedule(s). In one illustrative embodiment, for example, the control circuit 52 executes step 78 by extrapolating between the one or more corresponding low and high tailshaft speed shift point schedule(s), LSPS and HSPS respectively. This extrapolation may be based on either one or both of LSPS and HSPS. In either case, the extrapolation will result in one or more CSPS that is/are shaped identical or similar to LSPS and/or HSPS, or shaped according to a combination of LSPS and HSPS, with respect to throttle position or percentage, and appropriately shifted, based on VW, with respect to tailshaft speed.

Following steps 72, 76 and/or 78, algorithm execution advances to step 80 where the control circuit 52 is operable to implement the one or more current shift point schedule(s). Illustratively, the control circuit 52 is operable to execute step 80 in a conventional manner by determining a current value of the tailshaft speed via the tailshaft speed sensor 46, determining a current throttle percentage value, which the control circuit 12 may determine as described hereinabove and provide to the control circuit 52 via the communications link 54, and controlling the automatic shifting of the transmission 18 in a conventional manner between two or more gear ratios in accordance with the one or more current shift point schedule(s), CSPS. Following step 80, execution of the algorithm 60 loops back to step 68. It will be understood, however, that in embodiments of the algorithm 60 wherein the vehicle weight information, VW, is not computed continually and is instead manually entered into the control circuit 12 as described hereinabove, step 80 the algorithm 60 will be modified to loop from step 80 back to step 70.

In one embodiment, the one or more low tailshaft speed shift point schedule(s), LSPS, the one or more high tailshaft speed shift point schedule(s), HSPS, and the one or more current shift point schedule(s), CSPS, include five different transmission shift point schedules; one each for normal, corresponding to the torque converter mode of operation of the torque converter 16, upshifting and downshifting between two or more automatically selectable gear ratios of the transmission, one each for lockup, corresponding to the lockup mode of operation of the torque converter 16, upshifting and downshifting between two or more automatically selectable gear ratios of the transmission 18, and one for downshifting between two or more automatically selectable gear ratios of the transmission 18 when the engine brake 56 is activated, e.g., when the on/off switch 33 is in the on position. It will be understood that each of the five different shift point schedules will typically include separate shift point schedules for shifting between the various number of gears of the transmission 18. In other embodiments, the one or more low tailshaft speed shift point schedule(s), LSPS, the one or more high tailshaft speed shift point schedule(s), HSPS, and the one or more current shift point schedule(s), CSPS, may include more, fewer and/or different shift point schedules.

Referring now to FIG. 2B, a flowchart is shown of another illustrative embodiment of a software algorithm 85 that is executable by the system 10 of FIG. 1 to control shift points of the transmission 18 based on the weight of the vehicle. As with the algorithm 60, the algorithm 85 may be executed in whole or in part by either of the control circuits 12 and 52, although it will be described in the following paragraphs as being executed, except where noted, by the control circuit 52. Also as with the algorithm 60, a memory unit associated with the control circuit 52 and/or the memory unit 15 has, in this embodiment, stored therein at least one set of instructions that is/are executable by the control circuit 52, or alternatively the control circuit 12, to control shifting between the automatically selectable gear ratios of the transmission 18 in accordance with the software algorithm 85.

The algorithm 85 begins at step 66, and at step 88 one or more default shift point schedule(s), DSPS, based on a target weight of the vehicle carrying the system 10, is/are established. The one or more default tailshaft speed shift point schedules, LSPS, is/are determined in a conventional manner, as described hereinabove, wherein the target vehicle weight is a vehicle weight between the curb weight, CW, corresponding to a load-free weight of the vehicle as delivered from the vehicle manufacturer or other low vehicle weight that is greater than CW, and the gross vehicle weight rating, GVWR, corresponding to the maximum total weight of the vehicle carrying its maximum allowable load, or other high vehicle weight that is less than GVWR. Illustratively, the target weight upon which DSPS is/are determined may correspond to a vehicle weight at which the vehicle carrying the system 10 is expected to operate more times than not, which is generally between CW and GVWR, although this disclosure contemplates that the target vehicle weight may alternatively be set to any weight value between CW and GVWR. In the illustrated embodiment, DSPS is/are "established" by storing the one or more corresponding DSPS shift point schedules in the memory unit associated with the control circuit that is executing the algorithm 85, e.g., in the memory unit associated with the control circuit 52. Alternatively, DSPS may be established by storing DSPS in a memory unit that is not associated with the control circuit that is executing the algorithm 85 but that is accessible, e.g., via wired, wireless, satellite, cellular, internet (e.g., WWW) or other communications, by the control circuit that is executing the algorithm 85.

Following step 88, the algorithm 85 advances to step 90 where the weight (VW) of the vehicle carrying the system 10 is determined. Illustratively, the control circuit 52 may be operable to determine VW in the same manner described hereinabove with respect to step 68 of the algorithm 60 of FIG. 2A. Alternatively, other known processes for determining the weight of the vehicle, VW, may alternatively be used at step 90 as also described hereinabove.

Following step 90, the control circuit 52 is operable at step 92 to modify the one or more default shift point schedule(s), DSPS, as a function of VW, to form one or more corresponding modified shift point schedules, MSPS. For example, in cases where at least one of the one or more default shift point schedule(s) is a default upshift schedule, the control circuit 52 is operable to at step 92 to modify the default upshift schedule by extrapolating the default upshift schedule to lower rotational speeds of the tailshaft than those of the default upshift schedule if the weight, VW, is below the target vehicle weight upon which the default upshift schedule was based, and by extrapolating the default upshift schedule to higher rotational speeds of the tailshaft than those of the default upshift schedule if the weight, VW, is above the target vehicle weight upon which the default upshift schedule was based. In cases where at least one of the one or more default shift point schedule(s) is a default downshift schedule, the control circuit 52 is likewise operable to at step 92 to modify the default downshift schedule by extrapolating the default downshift schedule to lower rotational speeds of the tailshaft than those of the default downshift schedule if the weight, VW, is below the target vehicle weight upon which the default downshift schedule was based, and by extrapolating the default downshift schedule to higher rotational speeds of the tailshaft than those of the default downshift schedule if the weight, VW, is above the target vehicle weight upon which the default downshift schedule was based. In any case, the extrapolation will result in one or more MSPS that is/are shaped identical or similar to the one or more corresponding DSPS with respect to throttle position or percentage and appropriately shifted, based on VW, with respect to tailshaft speed.

Following step 92, algorithm execution advances to step 94 where the control circuit 52 is operable to implement the one or more modified shift point schedule(s) MSPS. Illustratively, the control circuit 52 is operable to execute step 94 in a conventional manner by determining a current value of the tailshaft speed via the tailshaft speed sensor 46, determining a current throttle percentage value, which the control circuit 12 determines as described hereinabove and provides to the control circuit 52 via the communications link 54, and controlling the automatic shifting of the transmission 18 in a conventional manner between two or more gear ratios in accordance with the one or more modified shift point schedule(s), MSPS. Following step 94, execution of the algorithm 85 loops back to step 90. It will be understood, however, that in embodiments of the algorithm 85 wherein the vehicle weight information, VW, is not computed continually and is instead manually or automatically entered into the control circuit 12 as described hereinabove, step 94 the algorithm 85 will be modified to loop from step 94 back to step 92.

In one embodiment, the one or more default tailshaft speed shift point schedule(s), DSPS, and the one or more modified shift point schedule(s), MSPS, include five different transmission shift point schedules shift point schedules; one each for normal, corresponding to the torque converter mode of operation of the torque converter 16, upshifting and downshifting between two or more automatically selectable gear ratios of the transmission, one each for lockup, corresponding to the lockup mode of operation of the torque converter 16, upshifting and downshifting between two or more automatically selectable gear ratios of the transmission 18, and one for downshifting between two or more automatically selectable gear ratios of the transmission 18 when the engine brake 56 is activated, e.g., when the on/off switch 33 is in the on position. In other embodiments, the one or more default tailshaft speed shift point schedule(s), DSPS, and the one or more modified shift point schedule(s), MSPS, may include more, fewer and/or different shift point schedules.

Figure 5:
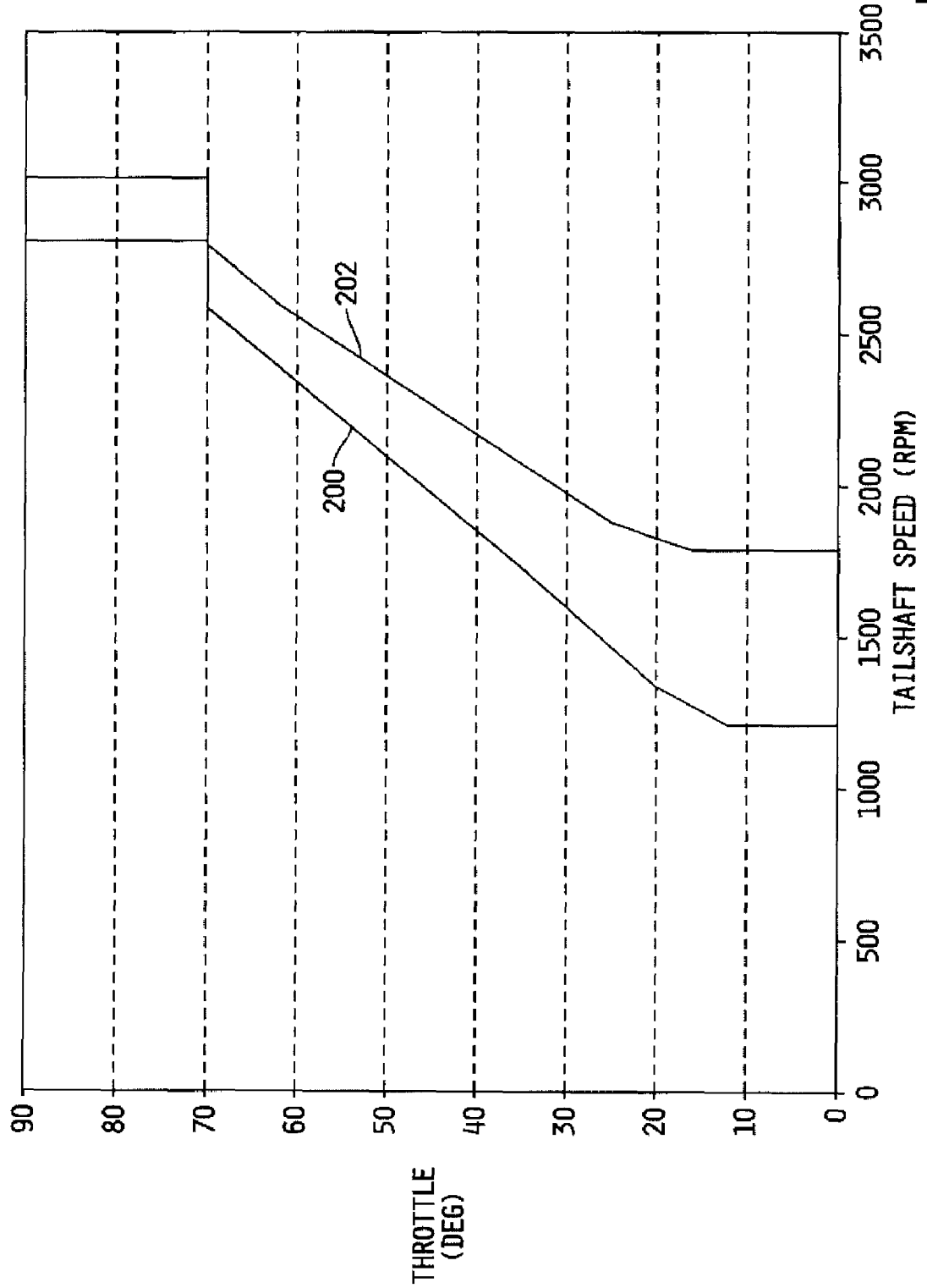
FIG. 5 is a plot of throttle position vs. tailshaft speed illustrating example transmission upshift schedules between two adjacent gears, during torque converter operating mode, at two different vehicle weights.
Figure 6:
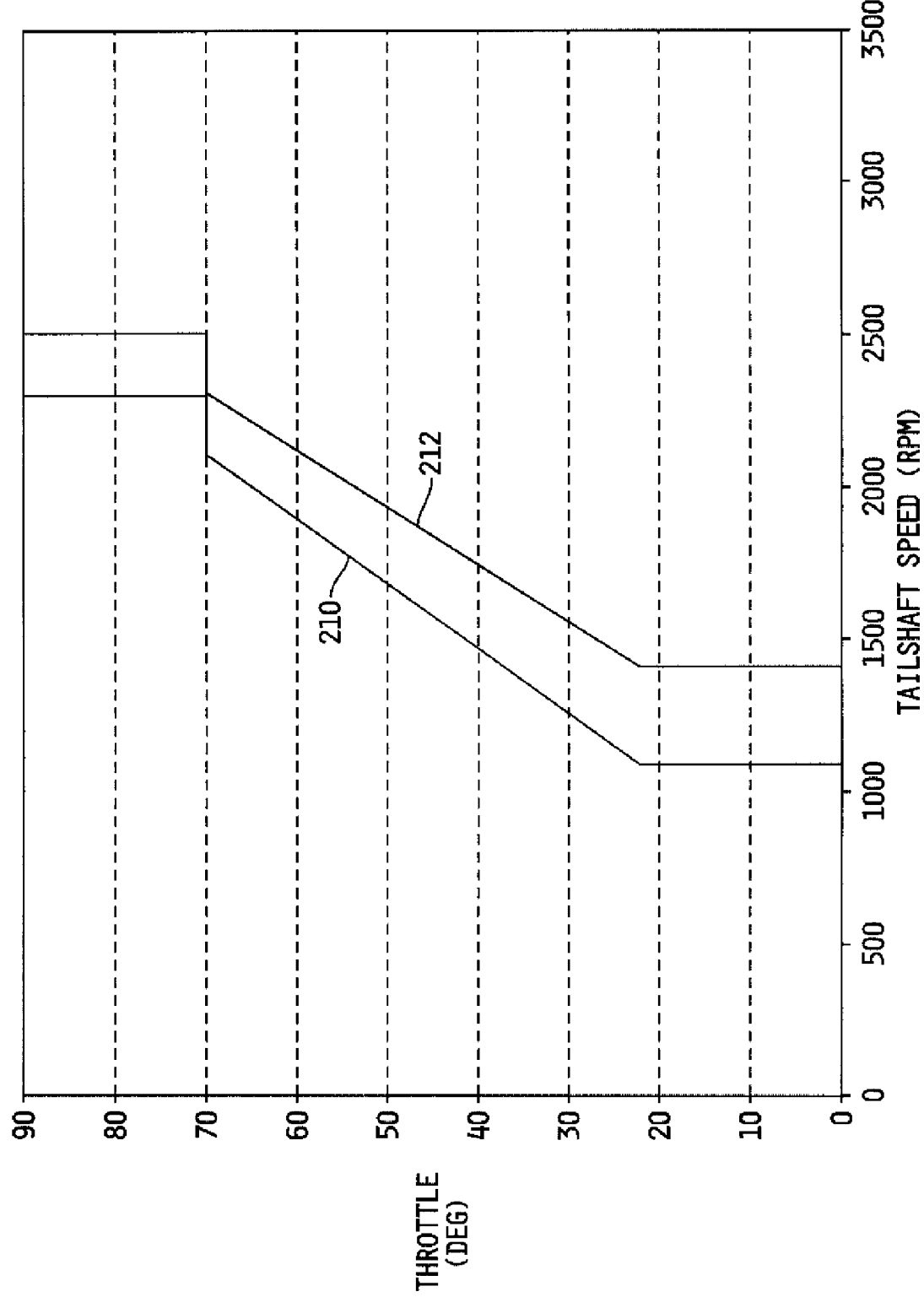
FIG. 6 is a plot of throttle position vs. tailshaft speed illustrating example transmission downshift schedules between two adjacent gears, during torque converter operating mode, at two different vehicle weights.
Figure 7:
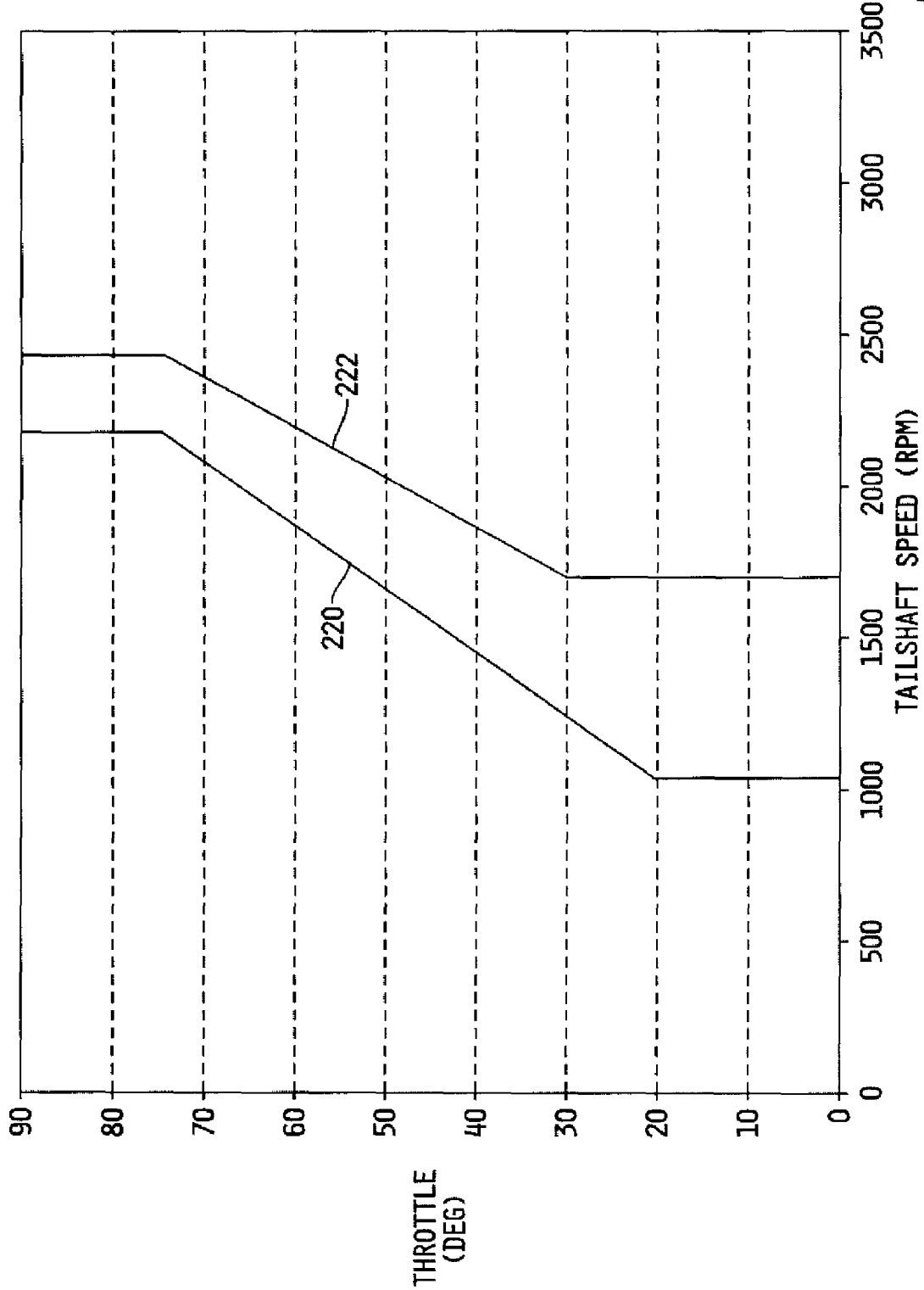
FIG. 7 is a plot of throttle position vs. tailshaft speed illustrating example transmission upshift schedules between two adjacent gears, during lockup operating mode of a torque converter, at two different vehicle weights.
Figure 8:
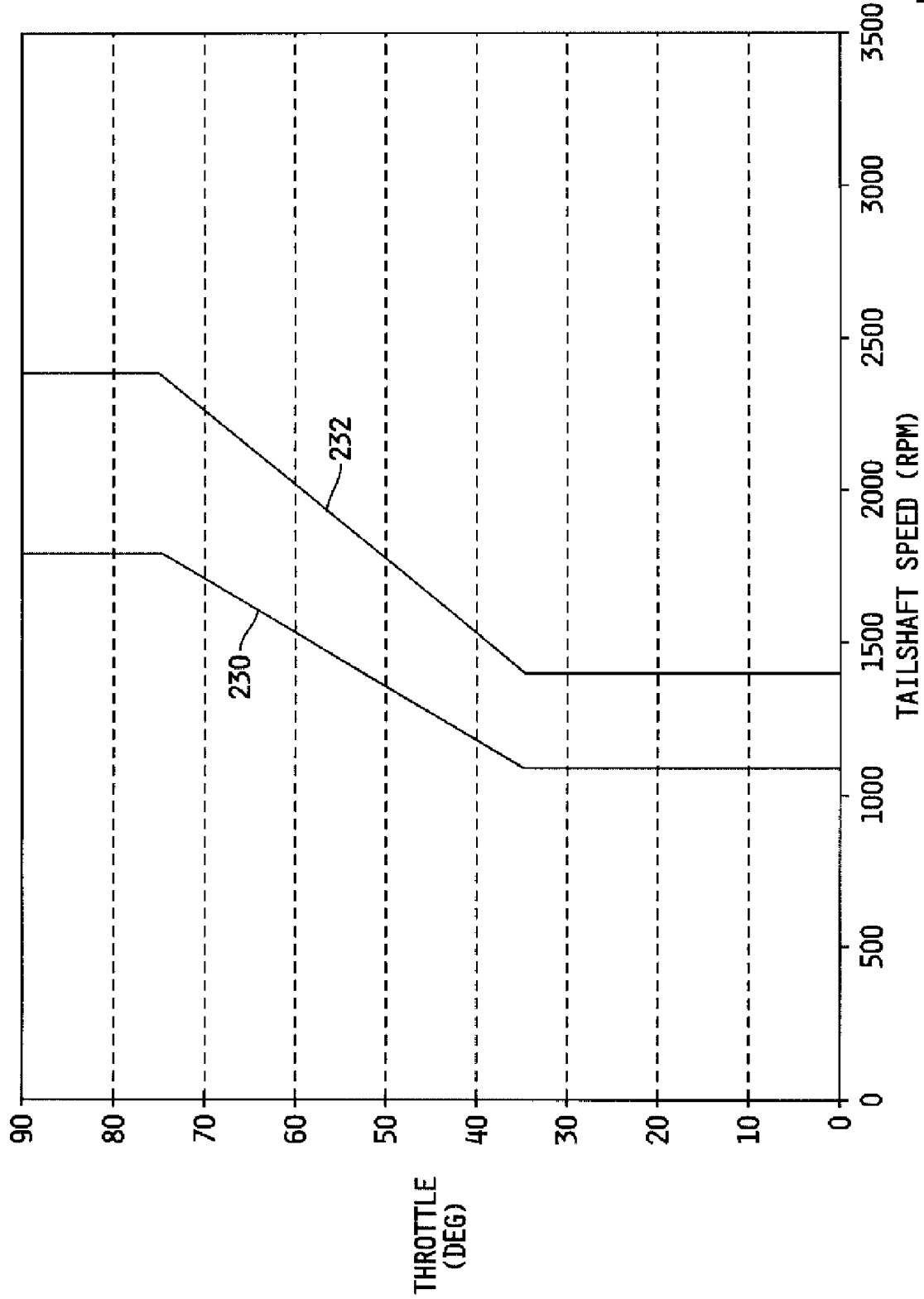
FIG. 8 is a plot of throttle position vs. tailshaft speed illustrating example transmission downshift schedules, during lockup operating mode of a torque converter, at two different vehicle weights.
Figure 9:
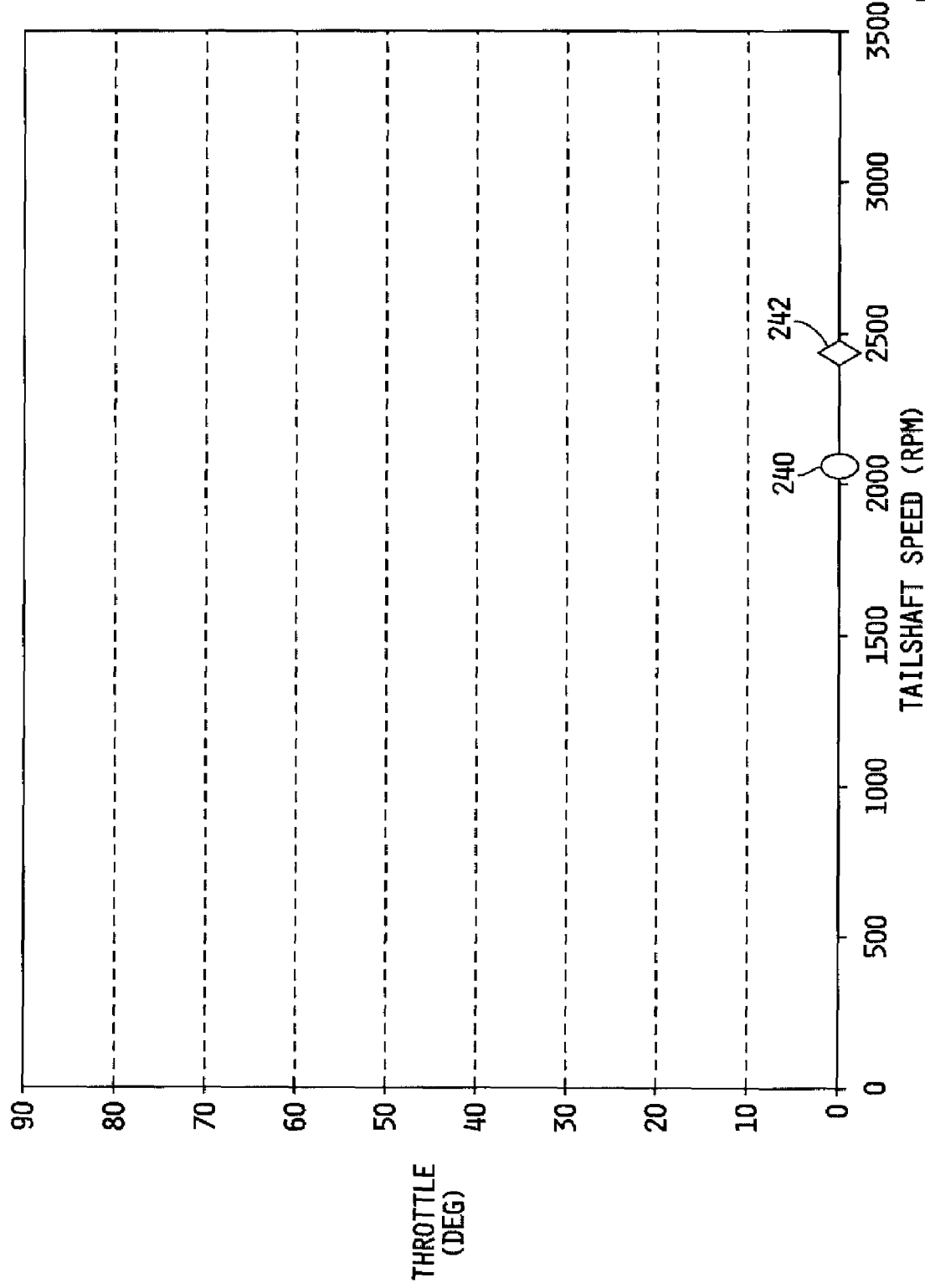
FIG. 9 is a plot of throttle position vs. tailshaft speed illustrating example transmission downshift schedules between two adjacent gears, during activation of an engine brake, at two different vehicle weights.

Referring now to FIG. 5, an example of a transmission shift point schedule for one upshift scenario is shown. In the illustrated example, a plot of throttle position vs. tailshaft speed illustrating example transmission upshift schedules for shifting between $3^{rd}$ and $4^{th}$ gears of the transmission 18, during torque converter operating mode, at two different vehicle weights is shown. In particular, a plot 200 of throttle position vs. tailshaft speed is shown for a transmission upshift schedule, during torque converter operating mode, for a vehicle weight that is at or near the curb weight, CW, of the vehicle, and a plot 202 of throttle position vs. tailshaft speed is shown for a transmission upshift schedule, during torque converter operating mode, for a vehicle weight that is at or near the gross vehicle weight rating, GVWR, Referring now to FIG. 6, an example of a transmission shift point schedule for one downshift scenario is shown. In the illustrated example, a plot of throttle position vs. tailshaft speed illustrating example transmission downshift schedules for downshifting between $4^{th}$ and $3^{rd}$ gears of the transmission 18, during torque converter operating mode, at two different vehicle weights is shown. In particular, a plot 210 of throttle position vs. tailshaft speed is shown for a transmission downshift schedule, during torque converter operating mode, for a vehicle weight that is at or near the curb weight, CW, of the vehicle, and a plot 212 of throttle position vs. tailshaft speed is shown for a transmission downshift schedule, during torque converter operating mode, for a vehicle weight that is at or near the gross vehicle weight rating, GVWR, Referring now to FIG. 7, an example of a transmission shift point schedule for another upshift scenario is shown. In the illustrated example, a plot of throttle position vs. tailshaft speed illustrating example transmission upshift schedules for upshifting between $3^{rd}$ and $4^{th}$ gears of the transmission 18, during lock-up operating mode of the torque converter 16, at two different vehicle weights is shown. In particular, a plot 220 of throttle position vs. tailshaft speed is shown for a transmission upshift schedule, during lock-up operating mode, for a vehicle weight that is at or near the curb weight, CW, of the vehicle, and a plot 222 of throttle position vs. tailshaft speed is shown for a transmission upshift schedule, during lock-up operating mode, for a vehicle weight that is at or near the gross vehicle weight rating, GVWR, Referring now to FIG. 8, an example of a transmission shift point schedule for another downshift scenario is shown. In the illustrated example, a plot of throttle position vs. tailshaft speed illustrating example transmission downshift schedules for downshifting between $4^{th}$ and $3^{rd}$ gears of the transmission 18, during lock-up operating mode of the torque converter 16, at two different vehicle weights is shown. In particular, a plot 230 of throttle position vs. tailshaft speed is shown for a transmission downshift schedule, during lock-up operating mode, for a vehicle weight that is at or near the curb weight, CW, of the vehicle, and a plot 232 of throttle position vs. tailshaft speed is shown for a transmission downshift schedule, during lock-up operating mode, for a vehicle weight that is at or near the gross vehicle weight rating, GVWR, Referring now to FIG. 9, an example of a transmission shift point schedule for another downshift scenario is shown. In the illustrated example, a plot of throttle position vs. tailshaft speed illustrating example transmission downshift schedules for downshifting between $4^{th}$ and $3^{rd}$ gears of the transmission 18, during activation of the engine brake 56, at two different vehicle weights is shown. In particular, a plot 240 of throttle position vs. tailshaft speed is shown for a transmission downshift schedule, during activation of the engine brake 56, for a vehicle weight that is at or near the curb weight, CW, of the vehicle, and a plot 242 of throttle position vs. tailshaft speed is shown for a transmission downshift schedule, during activation of the engine brake 56, for a vehicle weight that is at or near the gross vehicle weight rating, GVWR.

It will be understood that FIGS. 5-9 represent example transmission upshifting and downshifting schedules for shifting between $3^{rd}$ and $4^{th}$ gears of the transmission 18, and that, generally, downshift and upshift schedules for each of the five different shifting scenarios will typically include corresponding shift schedules for shifting between each of the number of gears of the transmission 18.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A system for controlling shift points of a transmission carried by a motor vehicle, the transmission including a tailshaft coupled to at least one wheel of the vehicle, the system comprising:
    means for determining a weight of the vehicle,
    a memory unit having stored therein at least one transmission shift point schedule and having stored therein at least one set of instructions, the at least one transmission shift point schedule comprising a default upshift schedule defining transmission shift points between two or more gear ratios of the transmission as a function of a throttle position, rotational speed of the tailshaft and a vehicle weight that is one of or between a minimum weight of the vehicle and a maximum weight of the vehicle, and
    a control circuit configured to determine the throttle position as a function of user-requested fueling and to execute the at least one set of instructions to modify the default upshift schedule as a function of the weight of the vehicle and as a function of the default upshift schedule by extrapolating the default upshift schedule to lower rotational speeds of the tailshaft than those of the default upshift schedule if the weight of the vehicle is below that upon which the default upshift schedule is based, and by extrapolating the default upshift schedule to higher rotational speeds of the tailshaft than those of the default upshift schedule if the weight of the vehicle is above that upon which the default upshift schedule is based, and to control automatic upshifting between two or more gear ratios of the transmission in accordance with the modified default upshift schedule.

2. The system of claim 1 further comprising a torque converter positioned between an internal combustion engine carried by the vehicle and the transmission, the torque converter operable in either of a lockup mode wherein a drive shaft of the engine is coupled directly to an input shaft of the transmission and a torque converter mode wherein the drive shaft of the engine is fluidly coupled to the input shaft of the transmission.

3. The system of claim 2 wherein the default upshift schedule corresponds to a default lockup upshift schedule when the torque converter is operating in lockup mode.

4. The system of claim 2 wherein the default upshift schedule corresponds to a normal default upshift schedule when the torque converter is operating in torque converter mode.

5. The system of claim 1 wherein the at least one default transmission shift point schedule comprises a default downshift schedule, and wherein the control circuit is configured to execute the at least one set of instructions to modify the default downshift schedule by extrapolating the default downshift schedule to higher rotational speeds of the tailshaft than those of the default downshift schedule if the weight of the vehicle is above that upon which the default downshift schedule is based, and by extrapolating the default downshift schedule to lower rotational speeds of the tailshaft than those of the default downshift schedule if the weight of the vehicle is above that upon which the default downshift schedule is based.

6. The system of claim 5 further comprising a torque converter positioned between an internal combustion engine carried by the vehicle and the transmission, the torque converter operable in either of a lockup mode wherein a drive shaft of the engine is coupled directly to an input shaft of the transmission and a torque converter mode wherein the drive shaft of the engine is fluidly coupled to the input shaft of the transmission.

7. The system of claim 6 wherein the default downshift schedule corresponds to a default lockup downshift schedule when the torque converter is operating in lockup mode.

8. The system of claim 6 wherein the default downshift schedule corresponds to a normal default downshift schedule when the torque converter is operating in torque converter mode.

9. The system of claim 5 further comprising an engine brake system configured when activated to selectively apply a retarding force to an internal combustion engine coupled to the transmission, wherein the default downshift schedule corresponds to an engine brake default downshift schedule when the engine brake system is activated.

10. The system of claim 1 wherein the transmission includes a tailshaft coupled to at least one wheel of the vehicle, and wherein the control circuit is configured to determine a throttle position as a function of user-requested fueling, and wherein the at least one transmission shift point schedule comprises a low speed shift point schedule defining transmission shift points between two or more gear ratios of the transmission as a function of the throttle position, rotational speed of the tailshaft and a minimum weight of the vehicle, and a high speed shift point schedule defining transmission shift points between two or more gear ratios of the transmission as a function of the throttle position, rotational speed of the tailshaft and a maximum weight of the vehicle, the low speed shift point schedule being defined at lower rotational speeds of the tailshaft than the high speed shift point schedule and wherein the control circuit configured to execute the at least one set of instructions to determine the modified at least one transmission shift point schedule as a function of at least one of the low speed shift point schedule and the high speed shift point schedule.

11. The system of claim 10 wherein the control circuit is configured to execute the at least one set of instructions to modify the at least one transmission shift point schedule by extrapolating between the low speed shift point schedule and the high speed shift point schedule as a function of the weight of the vehicle.

12. The system of claim 11 wherein the control circuit is configured to execute the at least one set of instructions to control shifting between the two or more gear ratios of the transmission in accordance with the low speed shift point schedule if the weight of the vehicle is within a first threshold weight range of the minimum weight of the vehicle.

13. The system of claim 11 wherein the control circuit is configured to execute the at least one set of instructions to control shifting between the two or more gear ratios of the transmission in accordance with the high speed shift point schedule if the weight of the vehicle is within a second threshold weight range of the maximum weight of the vehicle.

14. The system of claim 11 further comprising a torque converter positioned between an internal combustion engine carried by the vehicle and the transmission, the torque converter operable in either of a lockup mode wherein a drive shaft of the engine is coupled directly to an input shaft of the transmission and a torque converter mode wherein the drive shaft of the engine is fluidly coupled to the input shaft of the transmission.

15. The system of claim 14 wherein the low speed shift point schedule corresponds to a low speed lockup upshift schedule and the high speed shift point schedule corresponds to a high speed lockup upshift schedule when the torque converter is operating in lockup mode.

16. The system of claim 14 wherein the low speed shift point schedule corresponds to a low speed normal upshift schedule and the high speed shift point schedule corresponds to a high speed normal upshift schedule when the torque converter is operating in lockup mode.

17. The system of claim 14 wherein the low speed shift point schedule corresponds to a low speed lockup downshift schedule and the high speed shift point schedule corresponds to a high speed lockup downshift schedule when the torque converter is operating in lockup mode.

18. The system of claim 14 wherein the low speed shift point schedule corresponds to a low speed normal downshift schedule and the high speed shift point schedule corresponds to a high speed normal downshift schedule when the torque converter is operating in lockup mode.

19. The system of claim 11 further comprising an engine brake system configured when activated to selectively apply a retarding force to an internal combustion engine coupled to the transmission, wherein the low speed shift point schedule corresponds to a low speed engine brake downshift schedule and the high speed shift point schedule corresponds to a high speed engine brake downshift schedule when the engine brake system is activated.

20. The system of claim 1 wherein the vehicle further includes an accelerator pedal, and further comprising:

a speed sensor configured to produce a speed signal corresponding to rotational speed of the tailshaft, and a position sensor configured to produce a position signal corresponding to a position of the accelerator pedal relative to a reference position, wherein the control circuit is configured to determine the throttle position based on the position signal and to control automatic shifting of the transmission between the two or more gear ratios according to the modified upshift schedule based on the speed signal and the position signal.

* * * * *